(12) United States Patent
Miura et al.

(10) Patent No.: US 10,536,851 B2
(45) Date of Patent: Jan. 14, 2020

(54) WORKING MACHINE AND SETTING CHANGE SYSTEM FOR WORKING MACHINE

(71) Applicant: KUBOTA CORPORATION, Osaka-shi, Osaka (JP)

(72) Inventors: Keisuke Miura, Sakai (JP); Susumu Umemoto, Sakai (JP); Hiroyuki Araki, Sakai (JP); Yasuhisa Uoya, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 532 days.

(21) Appl. No.: 14/842,390

(22) Filed: Sep. 1, 2015

(65) Prior Publication Data

US 2015/0373545 A1    Dec. 24, 2015

Related U.S. Application Data

(62) Division of application No. 13/820,676, filed as application No. PCT/JP2012/068787 on Jul. 25, 2012, now Pat. No. 9,165,127.

(30) Foreign Application Priority Data

Jul. 25, 2011   (JP) .................................. 2011-162233
Sep. 22, 2011   (JP) .................................. 2011-207309
Sep. 22, 2011   (JP) .................................. 2011-207310

(51) Int. Cl.
*G05G 9/047*      (2006.01)
*B60R 25/10*      (2013.01)
(Continued)

(52) U.S. Cl.
CPC ............. *H04W 12/06* (2013.01); *A01B 76/00* (2013.01); *A01B 77/00* (2013.01); *A01B 79/005* (2013.01);
(Continued)

(58) Field of Classification Search
CPC ...... H04W 4/046; H04W 12/08; G08G 1/205; B60L 11/1846; G06F 21/31; G06F 21/32;
(Continued)

(56) References Cited

U.S. PATENT DOCUMENTS 5,960,378 A * 9/1999 Watanabe ................. E02F 3/32
                                                         37/415
5,963,129 A   10/1999 Warner
(Continued)

FOREIGN PATENT DOCUMENTS

EP    1 291 253 A1    3/2003
JP    2002-240683 A   8/2002
(Continued)

*Primary Examiner* — Kevin T Bates
*Assistant Examiner* — Golam Mahmud
(74) *Attorney, Agent, or Firm* — Birch, Stewart, Kolasch & Birch, LLP

(57) ABSTRACT

In addition to improving security of data communication between a control device and a mobile terminal, to make it possible to easily make the data communication. A working machine of the present invention is provided with a control device that can make wireless communication with a mobile terminal 3 storing a mobile-use ID code and stores a working machine-use ID code, wherein the control device is provided with: ID code checking means 41 adapted to check the mobile-use ID code obtained by ID code obtaining means 40 and the working machine-use ID code with each other; data communication means 42 adapted, in the case where as a result of the checking by the checking means, matching between the ID codes is established, to allow data communication between the mobile terminal 3 and the control device, and in the case where the matching is not established, not to allow the data communication; and ID code registration means adapted to register the working machine-use ID code in the mobile terminal 3 as the mobile-use ID code.

8 Claims, 24 Drawing Sheets

(51) Int. Cl.

| | | |
|---|---|---|
| *H04W 12/06* | (2009.01) | |
| *E02F 9/20* | (2006.01) | |
| *E02F 9/24* | (2006.01) | |
| *E02F 9/26* | (2006.01) | |
| *H04M 3/51* | (2006.01) | |
| *A01B 79/00* | (2006.01) | |
| *B66C 17/18* | (2006.01) | |
| *A01B 77/00* | (2006.01) | |
| *B66C 1/00* | (2006.01) | |
| *B66C 1/02* | (2006.01) | |
| *F15B 11/076* | (2006.01) | |
| *G05B 15/02* | (2006.01) | |
| *G06F 21/31* | (2013.01) | |
| *A01B 76/00* | (2006.01) | |

(52) U.S. Cl.
CPC .............. *B66C 1/00* (2013.01); *B66C 1/0256* (2013.01); *B66C 17/18* (2013.01); *E02F 9/2054* (2013.01); *E02F 9/24* (2013.01); *E02F 9/26* (2013.01); *F15B 11/076* (2013.01); *G05B 15/02* (2013.01); *G06F 21/31* (2013.01); *H04M 3/5166* (2013.01); *F15B 2211/275* (2013.01); *F15B 2211/324* (2013.01)

(58) Field of Classification Search
CPC .......... G06F 21/35; G06F 21/45; G06F 3/017; G06F 21/316; G06F 21/34; G06F 21/44; G06F 21/606; G06F 2221/2111; H04L 63/107
USPC ........................................................ 709/208
See application file for complete search history.

(56) References Cited

U.S. PATENT DOCUMENTS

| | | | | |
|---|---|---|---|---|
| 6,122,598 | A * | 9/2000 | Tanaka | E02F 3/308 299/30 |
| 6,169,948 | B1 * | 1/2001 | Fujishima | E02F 3/435 701/50 |
| 6,259,354 | B1 | 7/2001 | Underwood | |
| 6,522,964 | B1 * | 2/2003 | Miki | E02F 9/205 172/315 |
| 6,710,700 | B1 * | 3/2004 | Tatsukawa | B60R 25/04 340/5.52 |
| 6,850,153 | B1 | 2/2005 | Murakami et al. | |
| 7,801,512 | B1 * | 9/2010 | Myr | G08G 1/20 340/466 |
| 9,591,133 | B2 * | 3/2017 | Agulnik | H04M 3/4935 |
| 2002/0050922 | A1 * | 5/2002 | Sashida | B60R 25/04 340/5.72 |
| 2003/0046540 | A1 | 3/2003 | Nakamura et al. | |
| 2003/0137398 | A1 | 7/2003 | Shibata et al. | |
| 2004/0030919 | A1 | 2/2004 | Moriya et al. | |
| 2004/0147250 | A1 | 7/2004 | Adachi et al. | |
| 2005/0001712 | A1 | 1/2005 | Yarbrough | |
| 2005/0021200 | A1 | 1/2005 | Taki | |
| 2005/0052276 | A1 | 3/2005 | Kumazaki et al. | |
| 2005/0151618 | A1 | 7/2005 | Inagaki et al. | |
| 2005/0179519 | A1 | 8/2005 | Kawamura et al. | |
| 2006/0009906 | A1 | 1/2006 | Hellmich et al. | |
| 2006/0015730 | A1 | 1/2006 | Yuhara | |
| 2006/0038447 | A1 * | 2/2006 | Bruelle-Drews | B60N 2/0244 307/10.1 |
| 2006/0122774 | A1 * | 6/2006 | Nou | B60R 25/102 701/32.4 |
| 2006/0143463 | A1 | 6/2006 | Ikeda et al. | |
| 2006/0145836 | A1 | 7/2006 | Miyazaki | |
| 2007/0236329 | A1 | 10/2007 | Mori et al. | |
| 2007/0274576 | A1 | 11/2007 | Morita et al. | |
| 2007/0285209 | A1 | 12/2007 | Heusi et al. | |
| 2007/0296563 | A1 | 12/2007 | Higuchi et al. | |
| 2008/0012683 | A1 | 1/2008 | Ito | |
| 2008/0024296 | A1 * | 1/2008 | Jeong | B60R 16/037 340/539.26 |
| 2008/0275596 | A1 * | 11/2008 | Tarasinski | E02F 9/2004 701/1 |
| 2009/0102623 | A1 | 4/2009 | Tatebayashi et al. | |
| 2009/0243831 | A1 * | 10/2009 | Miura | E02F 3/963 340/450 |
| 2009/0244106 | A1 * | 10/2009 | Kuwae | B60K 35/00 345/690 |
| 2010/0010698 | A1 | 1/2010 | Iwashita et al. | |
| 2010/0013594 | A1 | 1/2010 | Komine et al. | |
| 2011/0060480 | A1 * | 3/2011 | Mottla | G06Q 10/02 701/2 |
| 2011/0153117 | A1 | 6/2011 | Koch et al. | |
| 2012/0254960 | A1 | 10/2012 | Lortz et al. | |
| 2012/0323763 | A1 | 12/2012 | Michael | |

FOREIGN PATENT DOCUMENTS

| | | |
|---|---|---|
| JP | 2002-302973 A | 10/2002 |
| JP | 2002-325143 A | 11/2002 |
| JP | 2003-85267 A | 3/2003 |
| JP | 2004-280310 A | 10/2004 |
| JP | 2005-032273 A | 2/2005 |
| JP | 2005-255094 A | 9/2005 |
| JP | 2005-264613 A | 9/2005 |
| JP | 2006-119889 A | 5/2006 |
| JP | 2007-132085 A | 5/2007 |
| JP | 2007-269181 A | 10/2007 |
| JP | 2008-220337 A | 9/2008 |
| JP | 2009-235720 A | 10/2009 |
| JP | 2010-174507 A | 8/2010 |
| JP | 4554108 B2 | 9/2010 |
| JP | 2011-120540 A | 6/2011 |

* cited by examiner

Fig.5
(a) 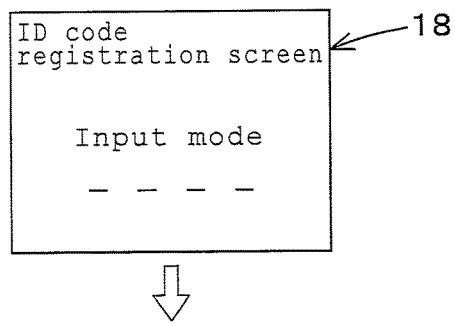
(b) 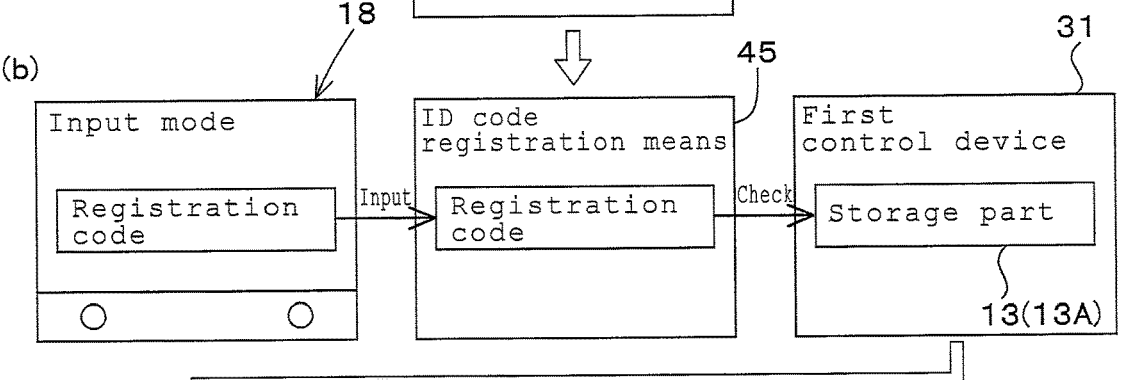
(c) 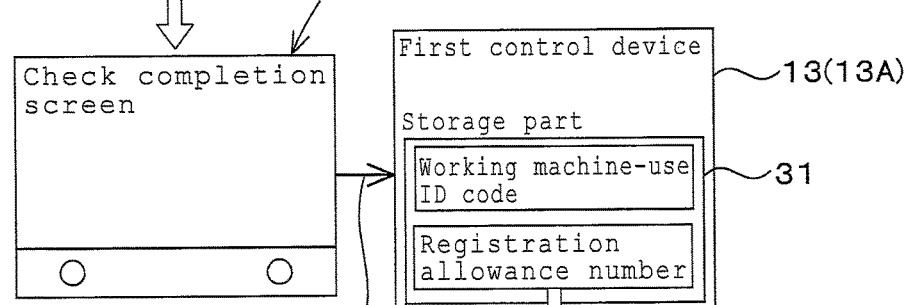
(d) 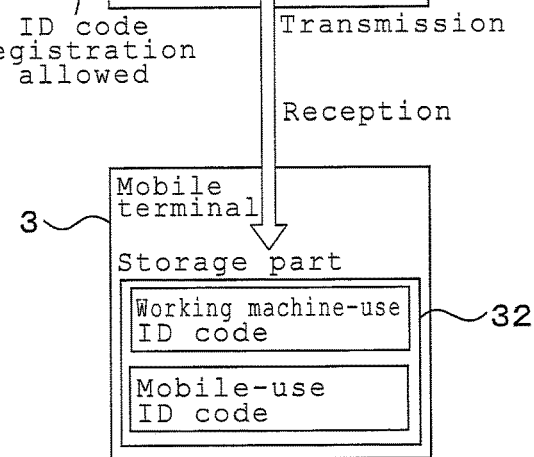

Fig.9

[Management server]

| | Tractor information | | | User information |
|---|---|---|---|---|
| Manufacturing number | Model number | Working machine-use ID code | Sale date (Purchase date) | |
| 10012 | M115A | **** | **** | Name, address, mail address of mobile terminal, phone number of mobile terminal, mobile-use ID code ... |
| 10001 | M135A | **** | **** | Name, address, mail address of mobile terminal, phone number of mobile terminal, mobile-use ID code ... |
| 10002 | M135A | **** | **** | Name, address, mail address of mobile terminal, phone number of mobile terminal, mobile-use ID code ... |

Fig.14

Tractor: Manufacturing number 10012, Model M115A, Working machine-use ID code: M1351006

User registration, name, address ...

| Due date | Number of times | Amount | Payment | Balance |
|---|---|---|---|---|
| 2011/2/20 | First time | 1200000 | 200000 | 1000000 |
| 2011/3/20 | Second time | 1200000 | 200000 | 800000 |
| 2011/4/20 | Third time | 1200000 | 200000 | 600000 |
| 2011/5/20 | Fourth time | 1200000 | 200000 | 400000 |
| 2011/6/20 | Fifth time | 1200000 | 200000 | 200000 |
| 2011/7/20 | Sixth time | 1200000 | 200000 | 0 |

WORKING MACHINE AND SETTING CHANGE SYSTEM FOR WORKING MACHINE

CROSS REFERENCE TO RELATED APPLICATIONS

This application is a Divisional of copending application Ser. No. 13/820,676, filed on Mar. 4, 2013, which was filed as PCT International Application No. PCT/JP2012/068787 on Jul. 25, 2012, which claims the benefit under 35 U.S.C. § 119(a) to Patent Application Nos. 2011-162233, 2011-207309 and 2011-207310, filed in Japan on Jul. 25, 2011 and Sep. 22, 2011, respectively, all of which are hereby expressly incorporated by reference into the present application.

TECHNICAL FIELD

The present invention relates to a working machine such as a tractor, backhoe, combine harvester, or transplanter, a data communication system of the working machine, an operation system for the working machine, and a setting change system for the working machine.

BACKGROUND ART

In recent years, technical development on a mobile terminal such as a mobile phone has been remarkable, and various techniques that attempt to apply the mobile terminal (mobile phone) to the field of working machines such as a tractor and a backhoe have been developed. For example, as a technique that uses a mobile phone to rewrite data in a control device of a construction machine, there is one disclosed in Patent Literature 1.

A construction machine compatible with a mobile phone in Patent Literature 1 is provided with: the control device; a sensor that is connected to the control device; a storage part that stores rewriting target data that can be rewritten by data on running information based on detection output of the sensor and data from a mobile phone; and a transceiver that transceiver data with the mobile phone by wireless or cable. When a data output mode of the mobile phone is selected, the construction machine compatible with a mobile phone inputs rewriting target data to the mobile phone from the control device of the construction machine, and then outputs data, which is intended to rewrite the rewriting target data, to the control device of the construction machine to rewrite the data.

Also, Patent Literature 2 discloses a working vehicle that is provided with communication means adapted to communicate with a portable terminal and code authentication means adapted to carry out authentication processing based on an authentication code inputted from the portable terminal and a preliminarily stored authentication code, and further provided with controlling means adapted to control on/off of a power source, wherein when the code authentication means authenticates the authentication code from the portable terminal, the power source is turned on.

Meanwhile, in a working machine such as a backhoe, in order to make the working machine to perform a desired operation, it is necessary to make various settings. Such various settings of the working machine are typically made on a display device provided around a driver's seat (e.g., Patent Literature 3).

Patent Literature 1 is adapted to be able to, on a display screen of a display device, display an operating member figure indicating an operating member that operates an actuator as well as displaying a maximum flow rate level of operating oil to be supplied/discharged to/from the actuator by an operation of the operating member corresponding to the operating member figure, and then change the maximum flow rate level while seeing the display screen (setting screen).

CITATION LIST

Patent Literature

Patent Literature 1
Japanese Patent No. 4554108
Patent Literature 2
Japanese Unexamined Patent Publication JP-A2008-220337
Patent Literature 3
Japanese Unexamined Patent Publication JP-A2009-235720

SUMMARY OF INVENTION

Technical Problem

Patent Literature 1 is adapted such that, only by putting the mobile phone into the data output mode, data in the control device of the construction machine can be rewritten, and therefore has a problem that as long as there is a mobile phone, even an unspecified number of third persons other than a user can easily rewrite data in the control device. That is, Patent Literature 1 has the problem that although a mobile phone can be used to rewrite data in the control device, security against data rewriting is poor, and data can be rewritten too easily.

Also, a technique of Patent Literature 2 is configured such that although the power source can be turned on by the authentication based on the authentication code inputted from the mobile terminal and the preliminarily stored authentication code, the authentication code to be stored in the working machine is one that a user can use a numeric keypad to freely set, and therefore the authentication code can be easily changed. For this reason, in the case of using the numeric keypad to change the authentication code to be stored in the working machine, the power of the working machine can be turned on, and therefore a third person different from a user who uses the working machine may be able to easily operate the working machine.

In the above-described Patent Literature 3, a driver (operator) sitting on the driver's seat can change the maximum flow rate level by operating the display device while seeing the setting screen displayed on the display device, which is convenient. However, in recent years, there has been a request asking for making various settings of the working machine by performing an operation at hand of the operator.

The present invention is, in consideration of the above-described problems, intended to provide a working machine and a data communication system for the working machine, which in addition to improving security of data communication between a control device and a mobile terminal, can easily make the data communication. Also, the present invention is intended to provide an operation system for a working machine, which can surely prevent the working machine from being operated by a third person. Further, the present invention is intended to provide a working machine and a setting change system for the working machine, which enables a setting of the working machine to be easily made by an operation at hand.

Solution to Problem

In order to accomplish the above-described objects, the present invention takes the following means.

That is, a working machine according to a first aspect of the present invention is provided with a control device that can make wireless communication with a mobile terminal and stores a working machine-use ID code, wherein the control device is provided with: ID code registration means adapted to register the working machine-use ID code in the mobile terminal as a mobile-use ID code; ID code checking means adapted to check the mobile-use ID code and the working machine-use ID code with each other; and data communication means adapted to, in a case where as a result of the checking by the checking means, matching between the ID codes is established, enable data communication between the mobile terminal and the control device, and in a case where the matching is not established, disable the data communication.

In a working machine according to a second aspect of the present invention, the control device stores a registration code; and a registration code different from the mobile-use ID code is transmitted from the mobile terminal to the ID code registration means, and in a case where matching between the registration code transmitted from the mobile terminal and the registration code is established, the ID code registration means transmits the working machine-use ID code to the mobile terminal.

A data communication system for a working machine according to a third aspect of the present invention is provided with a mobile terminal, and a control device that can make data communication with the mobile terminal and stores a working machine-use ID code, and provided with: ID code registration means adapted to register the working machine-use ID code in the mobile terminal as a mobile-use ID code; ID code checking means adapted to check the mobile-use ID code and the working machine-use ID code with each other; and data communication means adapted to, in a case where as a result of the checking by the checking means, matching between the ID codes is established, enable the data communication between the mobile terminal and the control device, and in a case where the matching is not established, disable the data communication.

In a data communication system for a working machine according to a fourth aspect of the present invention, the control device stores a registration code; the mobile terminal is adapted to be able to transmit a registration code different from the mobile-use ID code to the control device; and in a case where matching between the registration code transmitted from the mobile terminal and the registration code stored in the control device is established, the ID code registration means transmits the working machine-use ID code to the mobile terminal.

Also, an operation system for a working machine according to a fifth aspect of the present invention is provided with: a management server that manages the working machine; a mobile terminal that can make wireless communication with the working machine and the management server; and a control device that is provided in the working machine, wherein: the management server is provided with ID code transmitting means adapted to, after completion of user registration, transmit a mobile-use ID code to the mobile terminal; the mobile terminal is provided with data storage means adapted to store the mobile-use ID code transmitted from the ID code transmitting means, and data transmitting means adapted to transmit the mobile-use ID code stored in the data storage means to the working machine; and the control device is provided with ID code checking means adapted to check the mobile-use ID code transmitted from the mobile terminal and a preliminarily stored working machine-use ID code with each other, and control restriction means adapted, in a case where as a result of the checking by the checking means, matching between the ID codes is established, to allow normal control by the control device, and in a case where the matching is not established, not to allow the normal control.

In an operation system for a working machine according to a sixth aspect of the present invention, the ID code transmitting means of the management server is configured to transmit a preset operation allowable time to the mobile terminal together with the mobile-use ID code; the data storage means of the mobile terminal is configured to store the mobile-use ID code and the operation allowable time transmitted from the ID code transmitting means with relating the mobile-use ID code and the operation allowable time to each other, and the data transmitting means of the mobile terminal is configured to transmit the mobile-use ID code and the operation allowable time to the working machine; and the control restriction means of the control device is configured to, within the operation allowable time, allow the normal operation based on the established matching between the ID codes.

Also, a working machine according to a seventh aspect of the present invention is provided with a control device that can change a setting of the working machine, and provided with: content receiving means adapted to receive a setting changed on a mobile terminal side; and content storage means adapted to store the setting changed on the mobile terminal side as a new setting. A working machine according to an eighth aspect of the present invention is further provided with change instruction transmitting means adapted to, through wireless communication, transmit a change instruction signal that instructs a mobile terminal to change the setting, the mobile terminal being able to make communication with the control device through the wireless communication, wherein in response to the change instruction signal, the content receiving means receives the setting changed on the mobile terminal side.

In a working machine according to a ninth aspect of the present invention, the change instruction transmitting means transmits a setting already stored in the content storage means together with the change instruction signal.

In a working machine according to a tenth aspect of the present invention, the change instruction transmitting means transmits, together with the change instruction signal, a program for displaying, on a display part of the mobile terminal, a setting screen for changing a setting.

A working machine according to an eleventh aspect of the present invention is provided with content checking means adapted to check the setting received by the content receiving means and the setting transmitted from the mobile terminal with each other, wherein the content storage means is configured to, in a case where matching between the settings is established, store the setting received by the content receiving means as a new setting.

A setting change system for a working machine according to a twelfth aspect of the present invention is provided with: the working machine provided with a control device that can change a setting of the working machine; and a mobile terminal that can make communication with the control device through wireless communication, wherein the working machine is provided with: content receiving means adapted to receive a setting changed on the mobile terminal side; and content storage means adapted to store the setting received by the content receiving means as a new setting.

In a setting change system for a working machine according to a thirteenth aspect of the present invention, the working machine is further provided with change instruction transmitting means adapted to transmit a change instruction signal instructing the mobile terminal to change the setting, wherein in response to the change instruction signal, the content receiving means receives the setting changed on the mobile terminal side.

In a setting change system for a working machine according to a fourteenth aspect of the present invention, the change instruction transmitting means transmits a setting already stored in the content storage means together with the change instruction signal.

In a setting change system for a working machine according to a fifteenth aspect of the present invention, the change instruction transmitting means transmits, together with the change instruction signal, a program for displaying, on a display part of the mobile terminal, a setting screen for changing a setting.

A setting change system for a working machine according to a sixteenth aspect of the present invention is provided with content checking means adapted to check the setting received by the content receiving means and the setting transmitted from the mobile terminal with each other, wherein the content storage means is configured to, in a case where matching between the settings is established, store the setting received by the content receiving means as a new setting.

Advantageous Effects of Invention

According to the first aspect, with security of the data communication between the working machine (control device) and the mobile terminal being improved, the data communication can be easily made. Further, a mobile terminal that can make data communication with a specific working machine can be added, and therefore a plurality of mobile terminals can be used to make the data communication with the one working machine.

According to the second aspect, depending on a result of checking the registration codes, the working machine and the mobile terminal can be related to each other, and therefore security for the relating can be improved.

According to the third aspect, with the security of the data communication between the working machine (control device) and the mobile terminal being improved, the data communication can be easily made. Further, a mobile terminal that can make data communication with a specific working machine can be added, and therefore a plurality of mobile terminals can be used to make the data communication with the one working machine.

According to the fourth aspect, depending on a result of checking the registration codes, the working machine and the mobile terminal can be related to each other, and therefore security for the relating can be improved.

According to the fifth aspect, without making the user registration, the ID code (mobile-use ID code) for operating the working machine cannot be obtained, and therefore a third person can be prevented from operating the working machine.

According to the sixth aspect, with a third person being prevented from operating the working machine, even a user can be given a condition for the operation (operation allowable time), and therefore the working machine can be prevented from being carelessly operated.

According to the seventh, eighth, twelfth, and thirteenth aspects, with a worker operating the working machine holding the mobile terminal at hand, the worker can easily change the setting of the working machine only by operating the mobile terminal.

According to the ninth and fourteenth aspects, when the worker changes the setting, the worker can change the setting to new a setting while seeing the setting before the change, and therefore the worker easily plans how to change the setting from the current situation and can therefore easily change the setting.

According to the tenth and fifteenth aspects, even in the mobile terminal possessed by the worker does not have the setting control program, the worker can change the setting.

According to the eleventh and sixteenth aspects, reliability of the setting change by the mobile terminal can be increased.

BRIEF DESCRIPTION OF DRAWINGS

FIG. 5 is an explanatory diagram explaining ID code registration.

FIG. 9 is a diagram illustrating information stored in a database.

FIG. 14 is a diagram illustrating a payment schedule.

DESCRIPTION OF EMBODIMENTS

First Embodiment

In the following, an embodiment of the present invention is described on the basis of the drawings.

Figure 1:
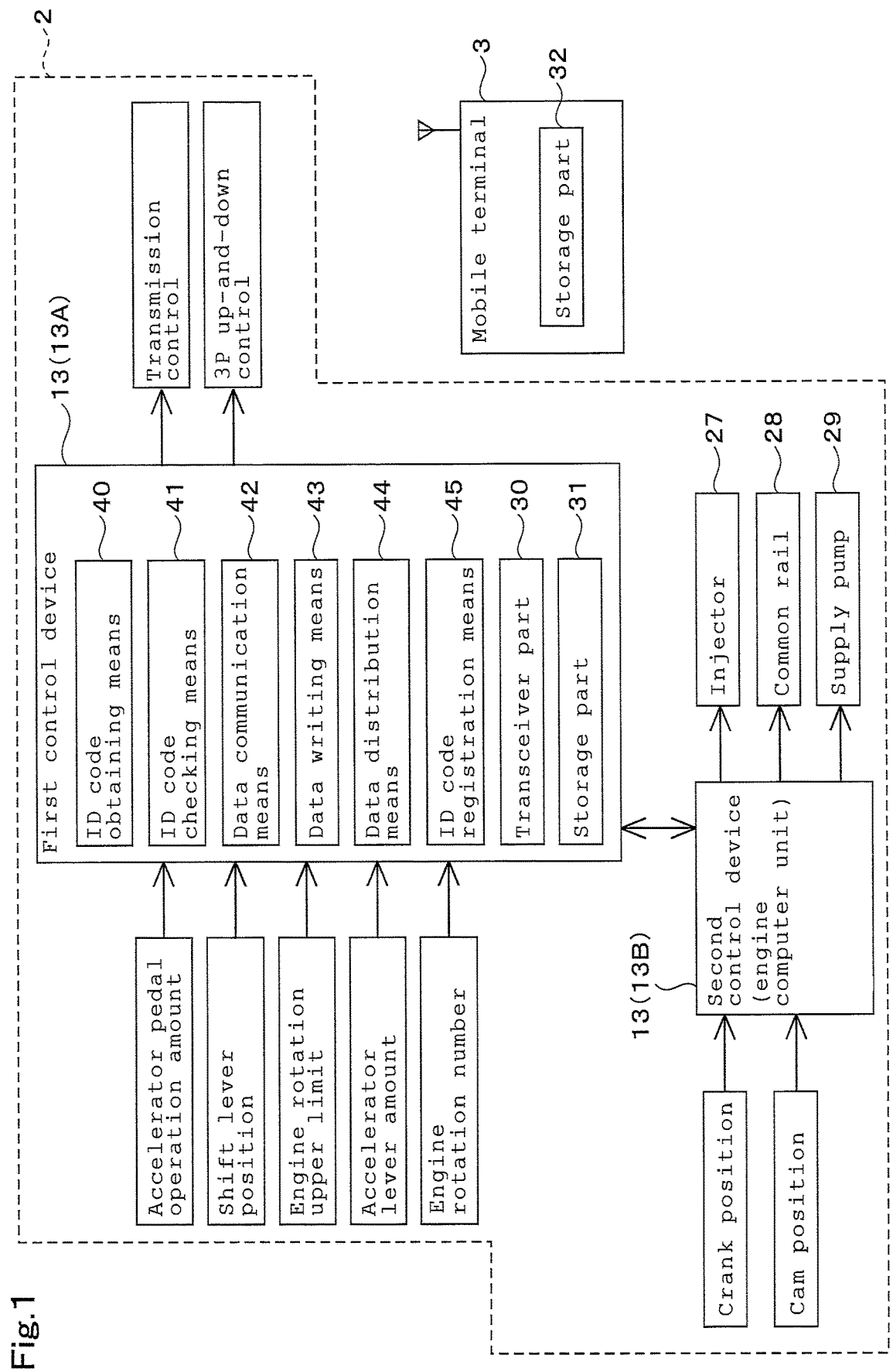
FIG. 1 is an overall view of a data communication system for a working machine.

FIG. 1 illustrates an overall view of a data communication system for a working machine.

The data communication system 1 for a working machine is a system for making data communication between the working machine 2 such as a tractor, backhoe, combine harvester, or transplanter, and a mobile terminal 3.

The mobile terminal 3 is a PDA (Personal Data Assistance), a tablet PC, or the like that is easily carried and can make wireless communication, and includes a smartphone or mobile phone having a telephone function. Also, the mobile terminal 3 is one that can, through the data communication, transmit a control program and control parameter necessary for the working machine to the working machine and obtain information the working machine has.

First, the working machine 2 that can make wireless communication with the mobile terminal 3 is described in detail by taking a tractor as an example.

Figure 6:
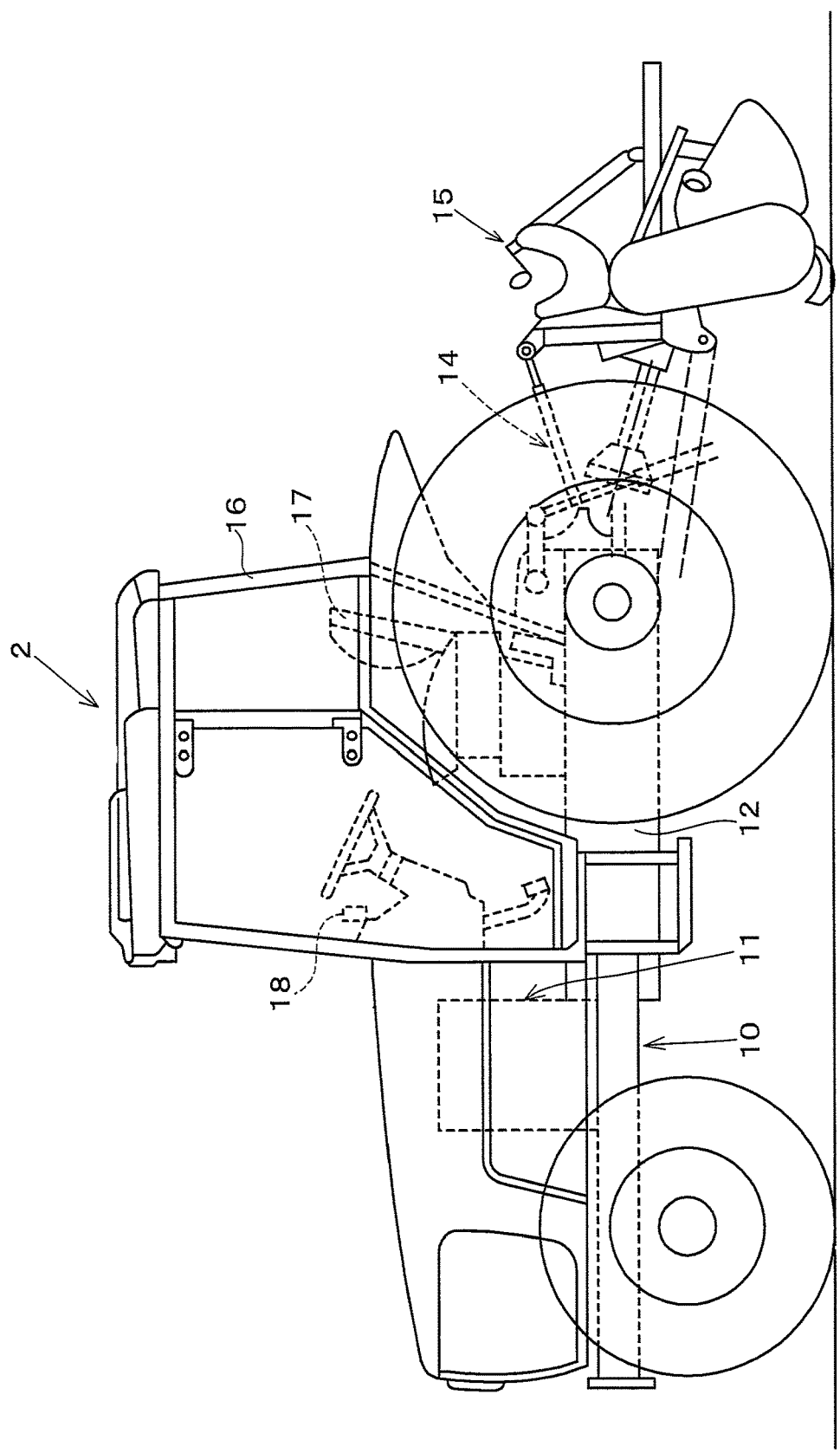
FIG. 6 is an overall view of a tractor.

As illustrated in FIG. 6, the tractor 2 is configured such that on a traveling car body 10 having wheels in front and rear parts, an engine (e.g., a diesel engine) 11, a transmission 12, a control device 13, and the like are mounted. On a rear side of the traveling car body 10, a three-point link mechanism 14 is provided so as to be movable up and down. Various types of working units (in the illustrated example, a cultivator) 15 can be attached/detached to/from the three-point link mechanism 14. The working unit 15 is adapted such that power from the engine 11 is transmitted thereto through a PTO shaft. Also, on a rear side of the engine 11, a cabin 16 of an independently mounted type is provided, and inside the cabin 16, a driver's seat 17 is provided. Around the driver's seat 17, a display device 18 for displaying various pieces of information on the tractor 2 is provided. The display device 18 is, differently from the mobile terminal 3, fixed around the driver's seat 17 of the tractor 2, and when an operator sits on the driver's seat 17, the operator can visually recognize content displayed on the display device 18 from the driver's seat 17. In other words, the display device 18 is a fixed type display device. Such a tractor 2 is adapted to be able to travel and work with the working unit 15.

The control device 13 is one that, in the tractor 2, controls a traveling system and a working system, and configured to include a CPU and the like. In the tractor 2, the traveling system control and the working system control are performed by a plurality of (e.g., two) control devices 13A and 13B. Note that the present embodiment is adapted to control the tractor 2 with the plurality of control devices 13A and 13B; however, the number of control devices 13 may be one or more.

The first control device 13A is one that controls the whole of the tractor 2, and adapted to be able to make mutual communication with the other control device 13B, i.e., the second control device 13B through an in-car communication network such as CAN (Controller Area Network) or FlexRay.

The first control device 13A is adapted to be inputted with an accelerator pedal operation amount at the time of operating an accelerator pedal, a shift lever position at the time of operating a transmission shift lever, and the like.

The first control device 13A is adapted to be able to output a control instruction to the second control device 13B on the basis of the accelerator pedal operation amount so as to control the engine 11 to have a predetermined rotation number, and also control the transmission 12 (performing transmission control) on the basis of the shift lever position. In addition, the first control device 13A is adapted to be inputted with an engine rotation upper limit, an accelerator lever amount, an engine rotation number, and the like. The engine rotation upper limit is adapted to be settable by a control provided near the driver's seat 17, and the accelerator lever amount is adapted to be settable by an accelerator lever provided near the driver's seat 17.

In the case where the engine rotation upper limit is inputted, the first control device 13A outputs a control instruction to the second control device 13B so as to prevent a rotation number of the engine 11 from exceeding the engine rotation upper limit.

Also, in the case where the accelerator lever amount is inputted, the first control device 13A is adapted to output a control instruction according to the accelerator pedal operation amount to the second control device 13B when the accelerator pedal operation amount is equal to or more than the accelerator lever amount, whereas when the accelerator pedal operation amount is less than the accelerator lever amount, the first control device 13A is adapted not to issue the control instruction according to the accelerator pedal operation amount to prevent the control of the rotation number of the engine 11 according to the accelerator pedal operation amount.

Further, the first control device 13A controls the display device 18 that displays various pieces of information on the tractor 2, such as the engine rotation number, a transmission gear level, oil temperature, and also, on the basis of input from an operating member, controls the upward and downward movements of the three-point link mechanism 14 (3P up-and-down control).

The second control device 13B (engine computer unit) is one that mainly controls the engine 11, and on the basis of input of the accelerator pedal operation amount, crank position, cam position, and the like outputted through the first control device 13A, controls an injector 27, common rail 28, supply pump 29, and the like. In addition, the engine control in the second control device 13B is the same as typical diesel engine control, and for example, by the control of the injector 27, a fuel injection quantity, injection timing, and a fuel injection rate are set, and by the control of the supply pump 29 and common rail 28, a fuel injection pressure is set.

The above-described first control device 13A and second control device 13B can control the traveling system and working system of the tractor 2. Note that the control of the traveling system and working system of the tractor 2 is not limited to the above-described one.

The first control device 13A is provided with a communication part (transceiver part) 30 for making the data communication with the mobile terminal 3 through the wireless communication. The present invention is systemized to determine whether or not to allow the data communication between the first control device 13A and the mobile terminal 3, and in the case where the data communication is allowed, to make the data communication, and in the case where the data communication is not allowed, not to make the data communication.

In the following, a data communication system 1 for the working machine 2 is described in detail.

In the data communication system 1 for the working machine 2, a working machine-use ID code, which is stored in the first control device 13A, and a mobile-use ID code, which is stored in the mobile terminal 3, are checked with each other, and in the case where matching between both of the ID codes is established, the data communication is made, whereas the matching between the ID codes is not established, the data communication is not made.

The working machine-use ID code is assigned to each tractor 2 (working machine 2), i.e., specific to the tractor 2; and for example, stored (saved) in a storage part 31 of the first control device 13A at the time of manufacturing the tractor 2 by a manufacturing company that manufactures the tractor 2. The mobile-use ID code is preliminarily stored in a storage part 32 of the mobile terminal 3 by after-mentioned ID code registration means 45.

The storage part 31 of the first control device 13A and the storage part 32 of the mobile terminal 3 are respectively configured to include, for example, nonvolatile memories.

As illustrated in FIG. 1, the first control device 13A is provided with ID code obtaining means 40, ID code checking means 41, and data communication means 42. The ID code obtaining means 40, ID code checking means 41, and data communication means 42 are respectively configured to include programs and the likes stored in the first control device 13A.

The ID code obtaining means 40 is means adapted to obtain the mobile-use ID code from the mobile terminal 3 through the wireless communication. Also, the ID code checking means 41 is means adapted to check the mobile-use ID code and the working machine-use ID code with each other. In the case where the matching between the ID codes checked by the ID code checking means 41 is established, the data communication means 42 brings the mobile terminal 3 and the first control device 13A into a data communicable state (enabled state), and in the case where the matching is not established, brings the mobile terminal 3 and the first control device 13A into a data incommunicable state (disabled state).

As illustrated in FIG. 2(a), in order for the first control device 13A to obtain the mobile-use ID code, for example, by operating a switch or the like provided for the display device 18, a menu for "Obtain ID code" is displayed on the display device 18. Then, when the menu for "Obtain ID code" is selected by the switch or the like, as illustrated in FIG. 2(b), the ID code obtaining means 40 is activated.

When the ID code obtaining means 40 is activated, first, in order to make an ID code request outside through the transceiver part 30, a signal is transmitted to search for a wirelessly communicable mobile terminal 3. Then, in the case where there is a response from the mobile terminal 3, the ID code obtaining means 40 makes a request for a mobile-use ID code to the mobile terminal 3, and obtains the mobile-use ID code transmitted from the mobile terminal 3.

As illustrated in FIG. 2(c), after the ID code obtaining means 40 has obtained the mobile-use ID code, the ID code checking means 41 is activated, and the working machine-use ID code, which is stored in the storage part 31 of the first control device 13A is called up by the ID code checking means 41. Then, the ID code checking means 41 checks the called-up working machine-use ID code and the mobile-use ID code with each other.

Figure 2:
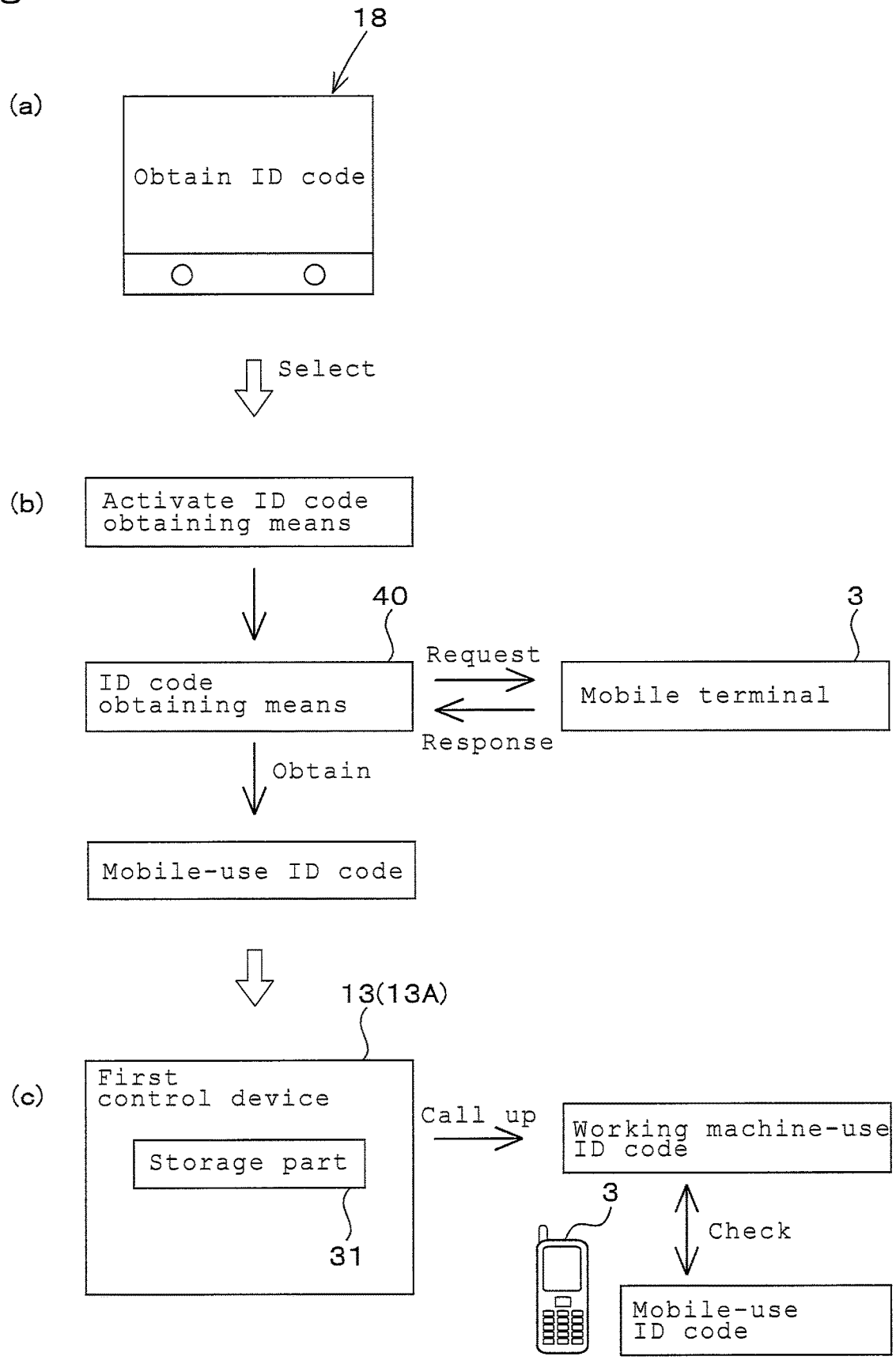
FIG. 2 is an explanatory diagram from obtaining a mobile-use ID code to checking ID codes.

Note that the timing to check the ID codes by the ID code checking means 41 is only required to be timing to make the data communication between the working machine 2 and the mobile terminal 2, and a method for the checking is not limited to the method illustrated in FIG. 2.

For example, assuming that the mobile-use ID code is "M13510006" and the working machine-use ID code is also "M13510006", the ID code checking means 41 determines that the matching between the ID codes is established because the mobile-use ID code and the working machine-use ID code coincide with each other. In the case where the mobile-use ID code and the working machine-use ID code does not coincide with each other, the ID code checking means 41 determines that the matching between the ID codes is not established.

Then, in the case where the matching between the ID codes is established, the data communication means 42 continues the wireless communication between the first control device 13A (transceiver part 30) and the mobile terminal 3, and also by enabling data transmission from the first control device 13A to the mobile terminal 3 as well as enabling reception of data transmitted from the mobile terminal 3, brings the both into the state where the data communication can be made.

In addition, the first control device 13A and the other control device mounted in the tractor 2 can make the mutual data communication through the CAN, and therefore in the data communicable state, data of the other control device can also be transmitted through the first control device 13A, and the other control device can receive data of the mobile terminal 3 through the first control device 13A.

On the other hand, in the case where the matching between the ID codes is not established, by disconnecting the wireless communication between the first control device 13A (transceiver part 30) and the mobile terminal 3 to disable the data transmission from the first control device 13A to the mobile terminal 3 as well as disabling the reception of data transmitted from the mobile terminal 3, the data communication means 42 brings the both into the state where the data communication cannot be made. In other words, in the case where the matching is not established, the data communication means 42 locks the data communication so as to prevent data from being bi-directionally communicated between the control device 13A and the mobile terminal 3. In addition, even in the state where the data communication is once locked by a failure in matching between the ID codes, only the mobile-use ID code and a registration code are preferably configured to be receivable.

Further, the first control device 13A is provided with data writing means 43, data distribution means 44, and the ID code registration means 45. The data writing means 43, data distribution means 44, and ID code registration means 45 are respectively configured to include programs and the likes stored in the first control device 13A.

The data writing means 43 is one that, in the state where the data communication means 42 makes it possible to make the data communication between the mobile terminal 3 and the first control device 13A, writes data transmitted from the mobile terminal 3. Also, the data distribution means 44 is one that, as with the data writing means 43, in the data communicable state, distributes (outputs) data to the mobile terminal 3.

Figure 3:
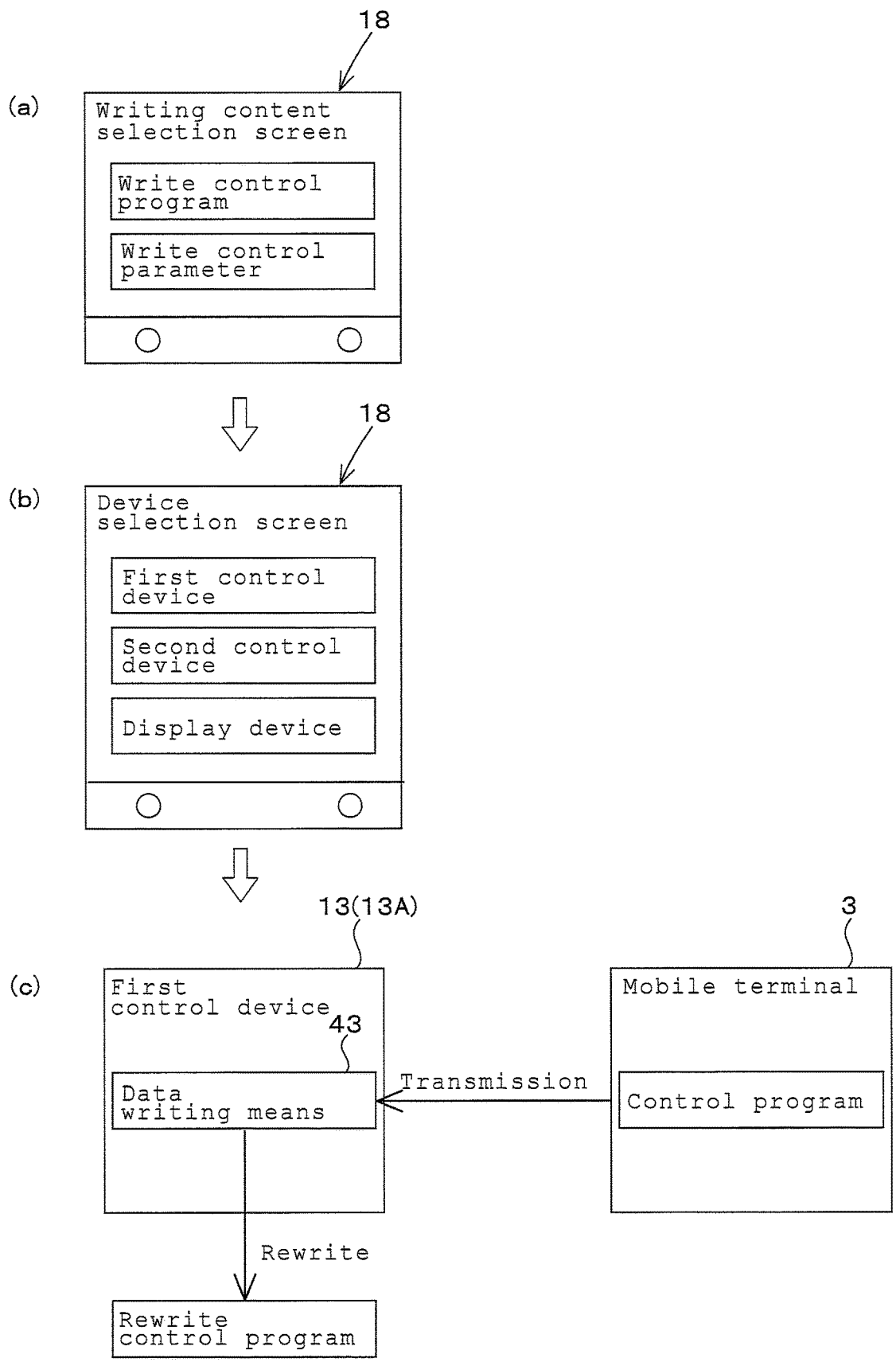
FIG. 3 is an explanatory diagram for the case of writing data in a first control device.

As illustrated in FIG. 3(a), when data is written at the time of maintaining the tractor 2 or performing another operation, the switch or the like of the display device 18 is operated to display a writing content selection screen for selecting content of the data writing. On the writing content selection screen, a menu for selecting content of the data writing is displayed, and the menu including, for example, "Write control program" and "Write control parameter" is displayed.

As illustrated in FIG. 3(b), when "Write control program" or "Write control parameter" is selected by operating the switch, a device selection screen for selecting a device (writing target device) for which a control program or a control parameter is written is displayed. On the device selection screen, for example, "First control device", "Second control device", and "Display device" are displayed.

As illustrated in FIG. 3(c), when a device is selected on the device selection screen in the data communicable state, the data writing means 43 makes a control program, which corresponds to a writing target device selected on the device selection screen, receivable from the mobile terminal 3 to the first control device 13A (transceiver part 30), and when receiving the control program transmitted from the mobile terminal 3, rewrites a control program for the device selected on the device selection screen. This enables a control program or the like to be freely rewritten as long as the control program and a control parameter for a device or the like mounted in the tractor 2 are stored in the mobile terminal 3.

Figure 4:
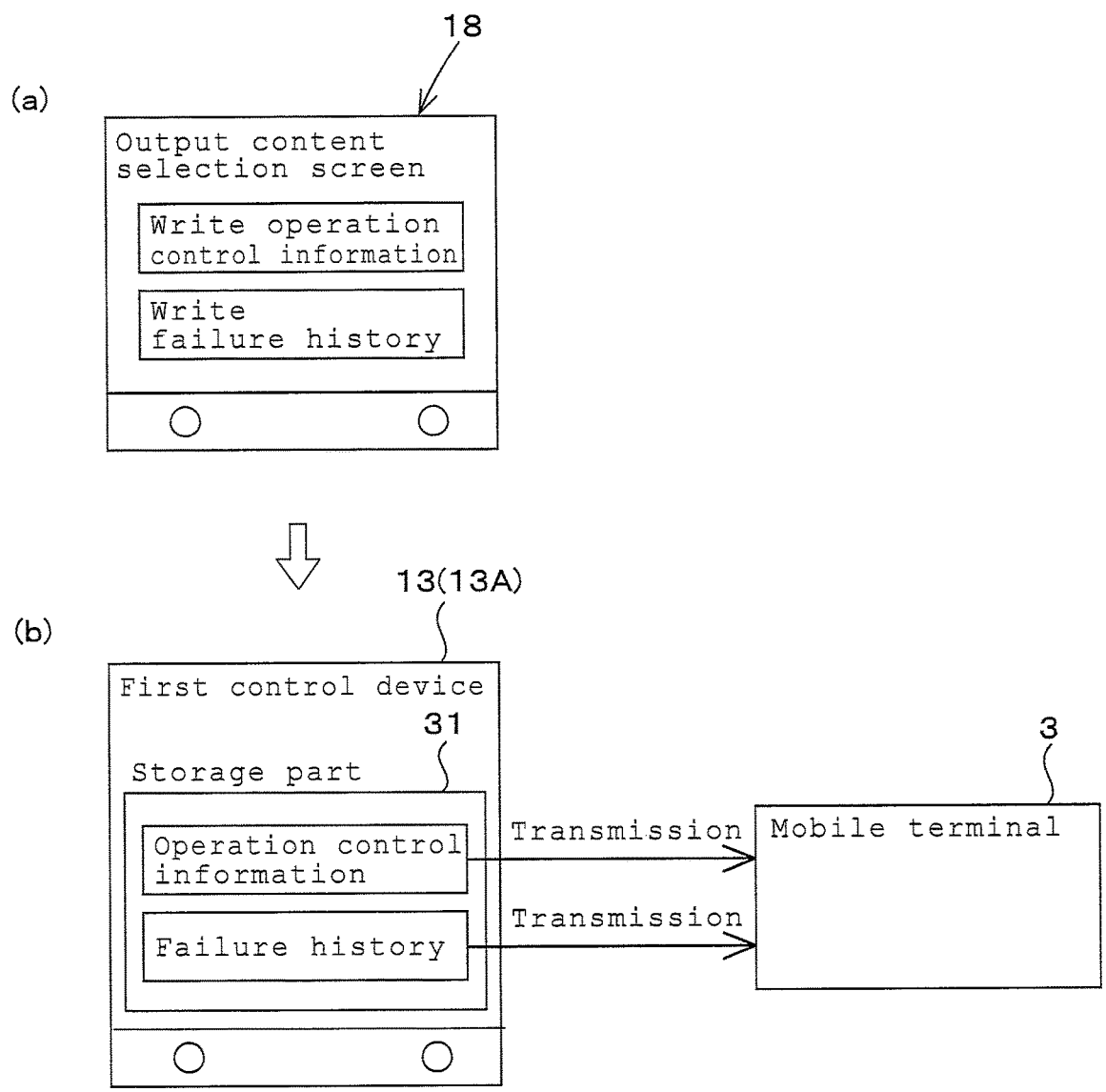
FIG. 4 is an explanatory diagram for the case of distributing (outputting) data from the first control device.

Also, as illustrated in FIG. 4(a), to distribute (output) data, by operating the switch or the like of the display device 18, an output content selection screen for selecting output content of data is displayed. On the output content selection screen, a menu for selecting the data output content is displayed. For example, assuming that pieces of data on operation control information and failure history are stored in the storage part 31 of the control device 13, the menu including "Output operation control information" and "Output failure history" is displayed. In addition, the operation control information refers to information that records an engine driving time of the tractor 2 on a date basis, and the failure history refers to a history that records failure time and a failure part with relating the failure time and the failure part to each other.

As illustrated in FIG. 4(b), in the data communicable state and in a state where output content is selected on the output content selection screen, the data distribution means 44 transmits content (operation control information or failure information) selected on the output content selection screen from the first control device 13A (transceiver part 30) to the mobile terminal 3. This enables data stored in the tractor 2 to be freely transmitted to the mobile terminal 3. Note that pieces of output content may include, in addition to the operation control information and the failure history, any data as long as the data is on the tractor 2.

The ID code registration means 45 is one that registers the working machine-use ID code in the mobile terminal 3 as the mobile-use ID code so as to establish the matching between the mobile-use ID code and the working machine-use ID code. In other words, the ID code registration means 45 relates the mobile-use ID code and the working machine-use ID code to each other to thereby enable the matching between the ID codes to be established.

As illustrated in FIG. 5(a), to register the working machine-use ID code in the mobile terminal 3 as the mobile-use ID code, first, by operating the switch or the like of the display device 18, an ID code registration screen is displayed. The ID code registration screen first enters an input mode in which a registration code for allowing registration is inputted. The registration code is preliminarily set for each tractor 2 separately from the working machine-use ID code or the mobile-use ID code, and unless the registration code is known, the working machine-use ID code cannot be registered in the mobile terminal 3 as the mobile-use ID code. The registration code is preliminarily stored in the storage part 31 of the first control device 13A.

The registration code is controlled by a manufacturing company that manufactures the tractor 2, a sales company that sells the tractor 2, and a rental company that rents the tractor 2, and in the case of registering the ID code, a user or the like obtains the registration code from any of these companies in advance.

As illustrated in FIG. 5(b), when the registration code is inputted in the input mode of the ID code registration screen, the ID code registration means 45 checks the inputted registration code with the registration code stored in the storage part 31 of the first control device 13A.

As illustrated in FIG. 5(c), in the case where the matching between the registration codes is established, the ID code registration means 45 displays, on the ID code registration screen, "Checking completed" indicating that the matching is established, and then allows the ID code registration to transmit the working machine-use ID code stored in the storage part 31 of the first control device 13A and a registration allowance signal to the mobile terminal 3 through the transceiver part 30. In the case where the matching between the registration codes is not established, the ID code registration means 45 does not transmit the working machine-use ID code to the mobile terminal 3, and therefore the ID code cannot be registered.

On the other hand, as illustrated in FIG. 5(d), upon receipt of the working machine-use ID code and the registration allowance signal that are transmitted from the tractor 2, i.e., the first control device 13A, the mobile terminal 3 stores the transmitted working machine-use ID code in the storage part 32 of the mobile terminal 3 as the mobile-use ID code.

This causes the specific tractor 1 and the specific mobile terminal 3 to be related to each other, and therefore the mobile terminal 3 can be used to make the data communication with the specific tractor 1.

In addition, the storage part 32 of the mobile terminal 3 may be adapted to be able to store a plurality of mobile-use ID codes. As a result, as long as the ID code registration means 45 is used to relate a plurality of tractors 2 to one mobile terminal 3, data communication with the plurality of tractors 2 can be made by the one mobile terminal 3. For example, it is assumed that there is a plurality of (three) tractors 2, and working machine-use ID codes of the respective tractors 2 are "M13510006", "M13510007", and "M1351008". In the case where a user using the tractors 2 obtains a registration code of the tractor 2 corresponding to "M13510006" and a registration code of the tractor 2 corresponding to "M13510007", and uses the two registration codes to register the ID codes by the ID code registration means 45, the user can use the mobile terminal 3 to make data communication with the two tractors 2 of the three tractors 2.

In addition, as another embodiment, in place of displaying the ID code registration screen on the display device 18, the ID code registration screen may be displayed on the mobile terminal 3. For example, by operating the mobile terminal 3, the ID code registration screen is displayed on a display screen of the mobile terminal 3. A program for displaying the ID code registration screen may be preliminarily stored in the mobile terminal 3, or obtained from the tractor 2 at the time of ID code registration through wireless communication.

In the case of the another embodiment, by operating the mobile terminal 3 to input a registration code in the input mode of the ID code registration screen, the inputted registration code is transmitted from the mobile terminal 3 to the tractor 2 (first control device 13A). When the registration code transmitted from the mobile terminal 3 is inputted, the ID code registration means 45 checks the inputted registration code and a registration code stored in the storage part 31 of the first control device 13A with each other, and in the case where matching between the registration codes is established, allows ID code registration to transmit a working machine-use ID code stored in the storage part 31 of the first control device 13A and a registration allowance signal to the mobile terminal 3 through the transceiver part 30. In the case where the matching between the registration codes is not established, the ID code registration means 45 does not transmit the working machine-use ID code to the mobile terminal 3, and therefore the ID code cannot be registered.

As still another embodiment, the above-described ID code obtaining means 40, ID code checking means 41, data communication means 42, ID code registration means 45, data writing means 43, and data distribution means 44 are not provided in the first control device 13A, but may be provided in another control device mounted in the tractor 2, for example, in the second control device. Also, the ID code obtaining means 40, ID code checking means 41, data communication means 42, ID code registration means 45, data writing means 43, and data distribution means 44 are not all provided in one control device, but may be provided with being dispersed in corresponding control devices.

According to the present invention, the control device is provided with the ID code checking means 41 and the data communication means 42, so that only in the case where matching between ID codes is established, data communication between the working machine 2 and the mobile terminal 3 becomes possible, and therefore security of the data communication in the working machine 2 can be improved.

In particular, unless matching (authentication) between a specific working machine 2 and a specific mobile terminal 3 is established, data communication between the both are not allowed, and therefore with security of data rewriting and writing being improved, the mobile terminal 3 can be used to freely make data communication with the specific working machine 2.

Also, the control device is provided with the ID code registration means 45, so that a mobile terminal 3 that can make data communication with a specific working machine 2 can be added, and therefore a plurality of mobile terminals 3 can be used to make data communication with the one working machine 2. Further, the control device is provided with the data writing means 43 and the data distribution means 44, and therefore writing, rewriting, and distribution (output) of data of the control device can be easily performed.

In the above-described embodiment, ID codes are checked with each other in the control device of the working machine 2; however, the ID codes may be checked with each other in the mobile terminal 3. For example, the mobile terminal 3 obtains a working machine-use ID code from the control device to check the obtained working machine-use ID code with a mobile-use ID code. Also, the present invention may be adapted such that in the case where matching is established in the mobile terminal 3, the mobile terminal 3 allows data communication between the mobile terminal 3 and the control device, whereas in the case where the matching is not established, the mobile terminal 3 does not allow the data communication. That is, the mobile terminal 3 may be provided with the ID code checking means 41 and the data communication means 42.

A method for obtaining a registration code is not particularly limited; however, the present invention may be adapted to, for example, use the mobile terminal 3 to access a management server of any of the manufacturing company, sales company, and rental company, and make user registration in the management server to thereby obtain the registration code from the management server.

Also, as described above, preferably, the manufacturing company stores a working machine-use ID code on a working machine side 2 (in a control device or the like) at the time of manufacturing the working machine 2; however, the present invention may be adapted to be able to, with use of the display device 18 or the like, manually store the working machine-use ID code in the control device or the like.

In the above-described embodiment, coincidence between a mobile-use ID code and a working machine-use ID code is set as a condition for matching establishment; however, in the case where a mobile-use ID code stored in the mobile terminal 3 and a working machine-use ID code stored on the working machine side are related to each other, the ID codes may be treated on the assumption that matching is established. For example, an encryption code used to make data communication between the working machine side and the mobile terminal side may be used as a working machine-use ID code or a mobile-use ID code, or an encryption code that changes with time may be used as a working machine-use ID code or a mobile-use ID code.

A mobile-use ID code used to make data communication may be one that is temporarily stored in the storage part 32 when, for example, the data communication is made (only when ID code checking is performed). For example, as described above, the ID code registration means 45 registers a working machine-use ID code in the mobile terminal 3 so as to be able to relate the working machine-use ID code as a mobile-use ID code, and then after ID code checking, the registered mobile-use ID code is automatically erased. Alternatively, the mobile-use ID code may be one that is not erased after the ID code checking but stored in the storage part 32 over a long period of time even after the ID code checking (even after the end of data communication).

Second Embodiment

Figure 7:
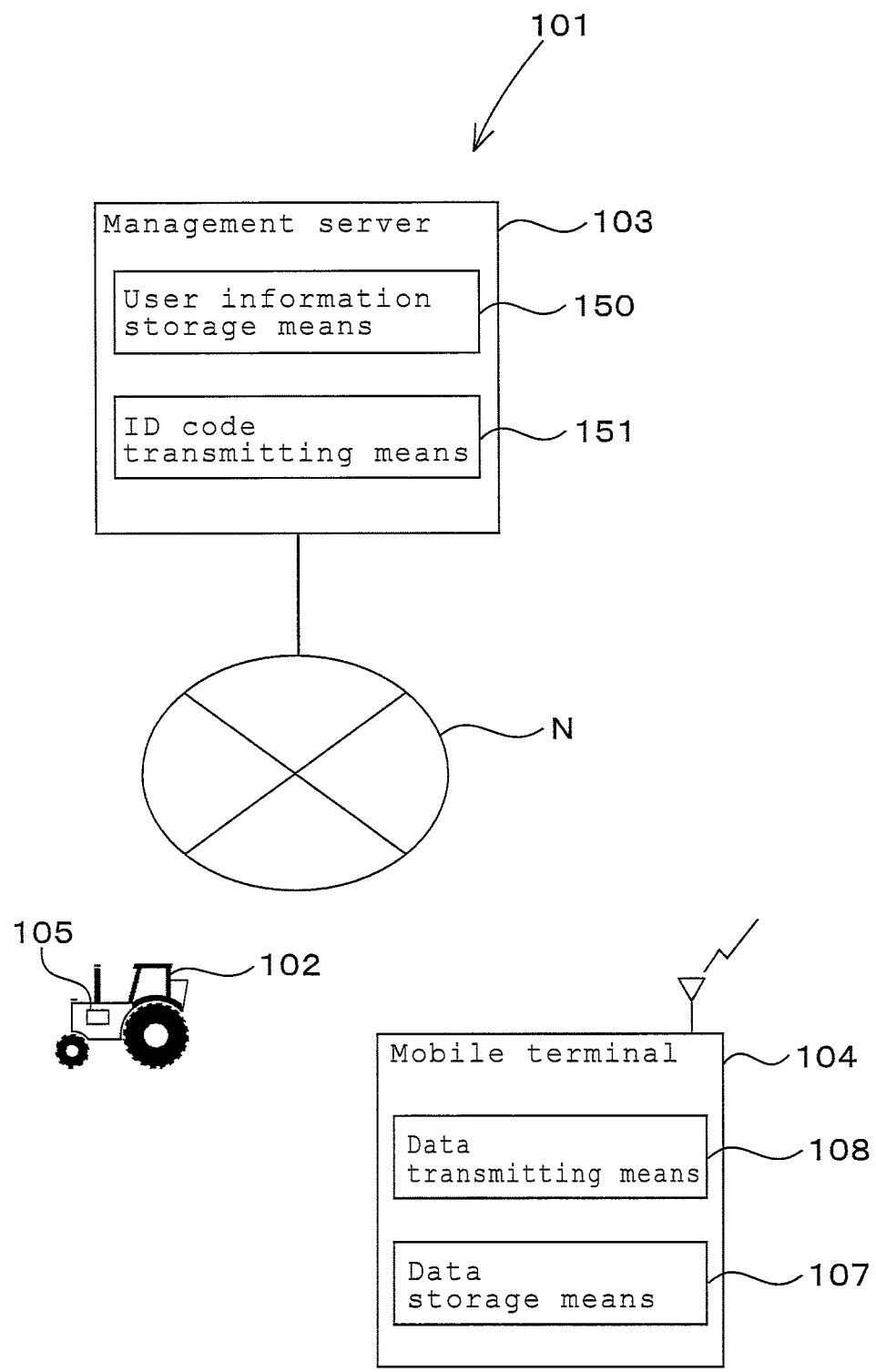
FIG. 7 is an overall view of an operation system for a working machine.

FIG. 7 illustrates an overall view of an operation system for a working machine.

The working machine operation system 101 is provided with: a management server 103 that manages the working machine 102; a mobile terminal 104 that can make wireless communication with the working machine 102 and the management server 103; and a control device 105 that is provided in the working machine 102.

The working machine operation system 101 is one that, when a user or the like using the working machine 102 makes user registration, transmits a mobile-use ID code from the management server 103 to the mobile terminal 104 through a network, and uses the mobile-use ID code transmitted to the mobile terminal 104 to or not to allow operation of the working machine 102.

The mobile terminal 104 is a PDA (Personal Data Assistance), a tablet PC, or the like that is easily carried and can make wireless communication, and includes a smartphone or mobile phone having a telephone function.

The mobile terminal 104 is provided with: data storage means 107 adapted to store the mobile-use ID code or the like transmitted from the management server 103; and data transmitting means 8 adapted to transmit the mobile-use ID code stored in the data storage means 107 to the working machine 102. The data storage means 107 is configured to include a nonvolatile memory and the like, and the data transmitting means 8 is configured to include a program and the like.

Next, a tractor is taken as an example to describe the working machine in detail.

Figure 15:
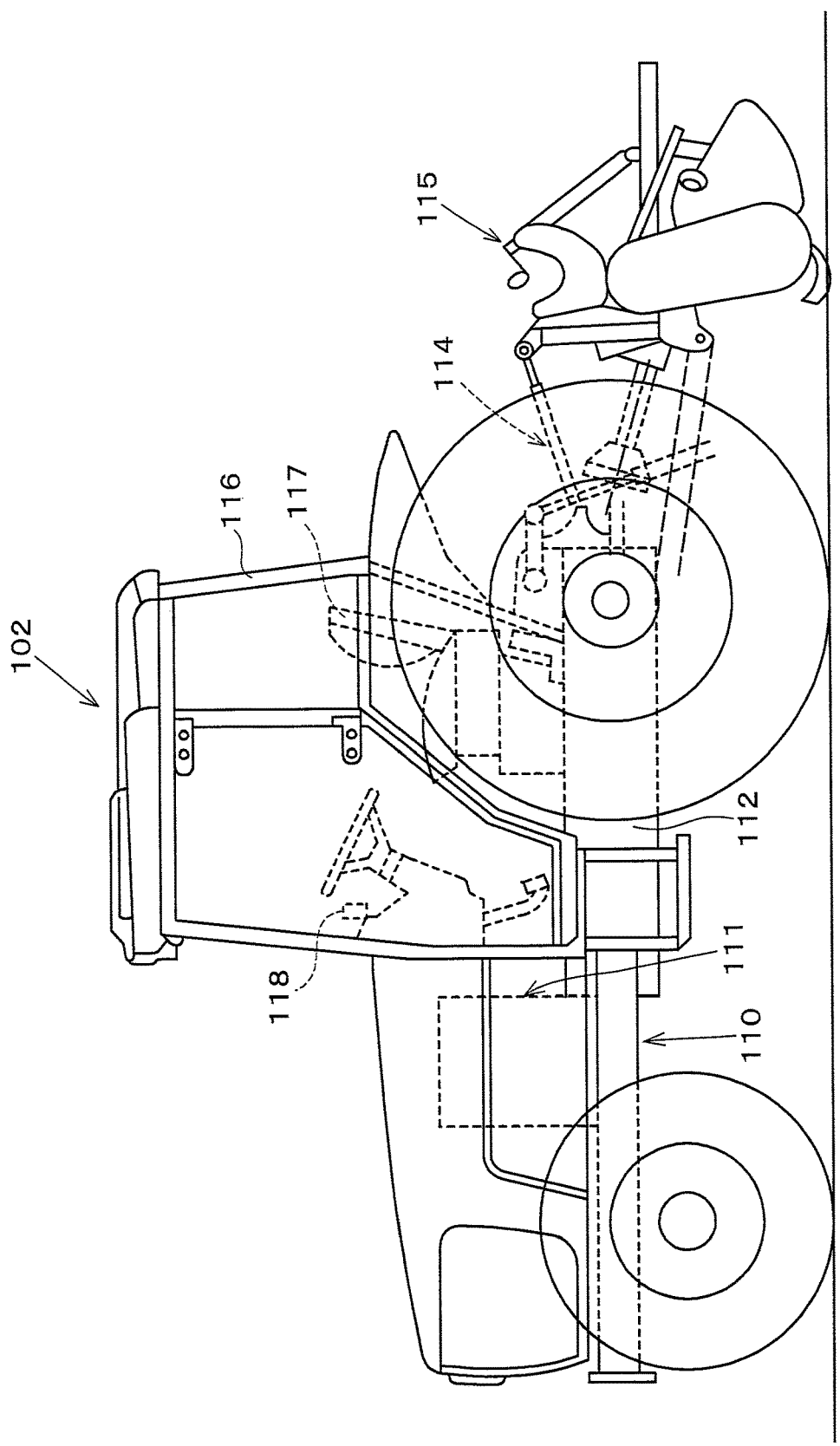
FIG. 15 is an overall view of the tractor.

As illustrated in FIG. 15, the tractor 102 is configured such that, on a traveling car body 110 having wheels in front and rear parts, an engine (e.g., a diesel engine) 111, a transmission 112, the control device 105, and the like are mounted. On a rear side of the traveling car body 110, a three-point link mechanism 114 is provided so as to be movable up and down. Various types of working units (in the illustrated example, a cultivator) 115 can be attached/detached to/from the three-point link mechanism 114. The working unit 115 is adapted such that power from the engine 111 is transmitted thereto through a PTO shaft. Also, on a rear side of the engine 111, a cabin 116 of an independently mounted type is provided, and inside the cabin 116, a driver's seat 117 is provided. Around the driver's seat 117, a display device 118 for displaying various pieces of information on the tractor 102 is provided. The display device 118 is, differently from the mobile terminal 104, fixed around the driver's seat 117 of the tractor 102, and when an operator sits on the driver's seat 117, the operator can visually recognize content displayed on the display device 118 from the driver's seat 117. Such a tractor 102 is adapted to be able to travel and work with the working unit 115.

Figure 8:
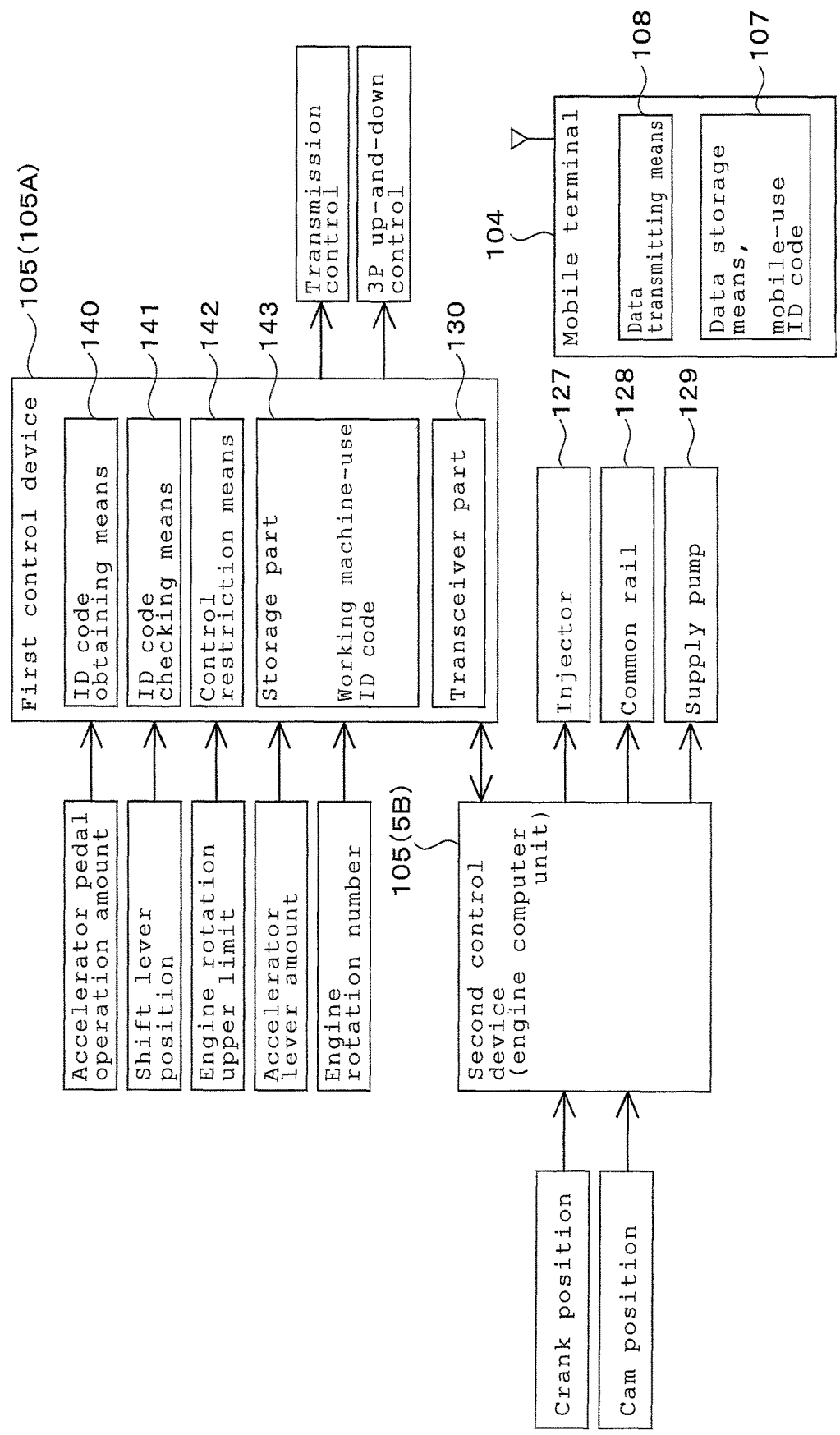
FIG. 8 is a control block diagram of the tractor.

As illustrated in FIG. 8, the control device 105 is one that controls a traveling system and a working system in the tractor 102, and configured to include a CPU and the like. In the tractor 102, the traveling system and the working system are controlled by a plurality of (e.g., two) control devices 105A and 105B. Note that the present embodiment is adapted to control the tractor 102 with the plurality of control devices 105A and 105B; however, the number of control devices 105 may be one or more.

The first control device 105A is one that controls the whole of the tractor 102, and adapted to make mutual communication with the other control device 105B, i.e., the second control device 105B through an in-car communication network such as CAN (Controller Area Network) or FlexRay. Also, the first control device 105A is adapted to be provided with a communication part (transceiver part) 130 for making wireless communication with the mobile terminal 104 such as a PDA (Personal Data Assistance) that is easily carried and can make the wireless communication, and able to make the wireless communication with the mobile terminal 104 through the communication part.

Further, the first control device 105A is adapted to be inputted with an accelerator pedal operation amount at the time of operating an accelerator pedal, a shift lever position at the time of operating a transmission shift lever, and the like. The first control device 105A is adapted to be able to output a control instruction to the second control device 105B on the basis of the accelerator pedal operation amount so as to control the engine 111 to have a predetermined rotation number, and also control the transmission 112 (performing transmission control) on the basis of the shift lever position.

In addition, the first control device 105A is adapted to be inputted with an engine rotation upper limit, an accelerator lever amount, an engine rotation number, and the like. The engine rotation upper limit is adapted to be settable by a control provided near the driver's seat 117, and the accelerator lever amount is adapted to be settable by an accelerator lever provided near the driver's seat 117.

In the case where the engine rotation upper limit is inputted, the first control device 105A outputs a control instruction to the second control device 105B so as to prevent the rotation number of the engine 111 from exceeding the engine rotation upper limit. Also, in the case where the accelerator lever amount is inputted, the first control device 105A is adapted to output a control instruction according to the accelerator pedal operation amount to the second control device 105B in the case where the accelerator pedal operation amount is equal to or more than the accelerator lever amount, whereas in the case where the accelerator pedal operation amount is less than the accelerator lever amount, the first control device 105A is adapted not to issue the control instruction according to the accelerator pedal operation amount to prevent the control of the rotation number of the engine 111 according to the accelerator pedal operation amount.

The first control device 105A controls the display device 18 that displays various pieces of information on the tractor 102, such as the engine rotation number, a transmission gear level, oil temperature, and also, on the basis of input from an operating member, controls the upward and downward movements of the three-point link mechanism 114 (3P up-and-down control).

The second control device 105B (engine computer unit) is one that mainly controls the engine 111, and on the basis of input of the accelerator pedal operation amount through the first control device 105A, crank position, cam position, and the like, controls an injector 127, a common rail 128, a supply pump 129, and the like. Note that the engine control in the second control device 105B is the same as typical diesel engine control, and for example, by the control of the injector 127, a fuel injection quantity, injection timing, and a fuel injection rate are set, and by the control of the supply pump 129 and common rail 128, a fuel injection pressure is set.

The first control device 105A and the second control device 105B can control the traveling system and working system of the tractor 102. Note that the control of the traveling system and working system of the tractor 102 is not limited to the above-described one.

Such a tractor 102 is adapted, in the case where matching between a mobile-use ID code transmitted from the mobile terminal 104 and a preliminarily stored working machine-use ID code is established, to allow the control by the control devices 105 to make the tractor 102 operable, and on the other hand, in the case where the matching is not established, not to allow the control to restrict the operation of the tractor 102. The ID codes are checked with each other by the first control device 105A or the second control device 105B.

In the following, with reference to FIG. 8, the first control device 105A is taken as an example to provide a description.

The first control device 105A is provided with ID code obtaining means 140, ID code checking means 141, and control restriction means 142. The ID code obtaining means 140, ID code checking means 141, and control restriction means 142 are respectively configured to include programs and the likes stored in the first control device 105.

The ID code obtaining means 140 is one that obtains a mobile-use ID code from the mobile terminal 104 through wireless communication. The ID code checking means 141 is one that checks the mobile-use ID code transmitted from the mobile terminal 104 and a working machine-use ID code stored on the tractor 102 side.

The working machine-use ID code is one that is assigned to each tractor 102 (working machine 2), i.e., specific to the tractor 2, and for example, stored (saved) in a storage part 143 of the first control device 105A. The storage part 143 is configured to include, for example, a nonvolatile memory. The working machine-use ID code is preliminarily written in the storage part 143 at the time of manufacturing the tractor 102 by a manufacturing company that manufactures the tractor 102.

The mobile-use ID code is one that is stored in the storage part (data storage means 107) of the mobile terminal 104, and for example, transmitted from the management server 103 (ID code transmitting means 151) and written in the storage part 107.

For example, at the starting time of the engine 111 of the tractor 102, or on another occasion, when the first control device 105A and the like are powered on to enable communication (wireless communication) between the transceiver part 130 and the outside, the ID code obtaining means 140 is activated to wait for transmission of the mobile-use ID code from the mobile terminal 104. In the case of, in such a state, by operating the mobile terminal 104, putting the mobile terminal 104 into an ID code transmitting mode enabling the mobile-use ID code to be transmitted, and transmitting the mobile-use ID code from the mobile terminal 104, the ID code obtaining means 140 obtains the mobile-use ID code transmitted from the mobile terminal 104.

Subsequently, after the ID code obtaining means 140 has obtained the mobile-use ID code, the ID code checking means 141 calls up the working machine-use ID code stored in the storage part 143 of the first control device 105A to check the called-up working machine-use ID code and the obtained mobile-use ID code with each other.

For example, assuming that the mobile-use ID code is "M13510006" and the working machine-use ID code is also "M13510006", the ID code checking means 141 determines that matching between the ID codes is established, because the mobile-use ID code and the working machine-use ID code coincide with each other. In the case where the mobile-use ID code and the working machine-use ID code does not coincide with each other, the ID code checking means 141 determines that the matching between the ID codes is not established.

In the case where the matching between the ID codes is established, the control restriction means 142 allows the control by the control devices 105 to perform normally performed control (normal control) without control restriction.

Specifically, after the matching between the ID codes has been established, the control restriction means 142 transmits an allowance signal, which allows control, to all of the control devices 105, and the respective control devices 105 performs the normal control on driving parts such as the engine 111, transmission 112, and three-point link mechanism 116 according to operations of the tractor 102.

On the other hand, in the case where the matching between the ID codes is not established, the control restriction means 142 does not allow the control by the control devices 105 (sometimes referred to as "control not allowed") to place a restriction on the control. Specifically, in the case where the matching between the ID codes is not established, a non-allowance signal, which does not allow the normal control, is transmitted to part or all of the control devices 105 (a signal indicating "control not allowed" is transmitted). At least one control device 105 having received the non-allowance signal partially or wholly stops or restricts control.

For example, even in the case where the accelerator pedal operation amount is inputted to the second control device 105B through the first control device 105A, the second control device 105B having received the non-allowance signal makes the accelerator pedal control amount zero (makes the accelerator pedal inoperable). That is, in the case where "control not allowed" is given by the control restriction means 142, the second control device 105B does not perform the normal control corresponding to the accelerator pedal, and an engine operation is restricted to prevent the tractor 102 from traveling. In addition, it should be appreciated that the stop or restriction of the normal control of the operation parts by the respective control devices 105 is not limited to the above-described one.

For example, the first control device 105A is adapted to control the transmission (operation part) on the basis of the shift lever position; however, the first control device 105A may be adapted, in the case of "control not allowed", not to perform the normal control of the transmission 12 based on the shift lever position, or not to perform the normal control of the three-point link mechanism 116 (operation part). To stop or restrict the normal control, it is preferable to partially or wholly stop control of the engine to prevent the tractor 102 from traveling.

In the tractor 102 as described above, for example, at the time of starting the engine of the tractor 102, the mobile-use ID code is transmitted from the mobile terminal 104 to the tractor 102 to check the ID codes with each other, and in the case where the matching between the ID codes is established, the tractor 102 can be operated. However, in the case where the matching between the ID codes is not established, the engine operation and the like of the tractor 102 can be restricted.

Next, the operation system 101 for the working machine is described in detail together with description of the above-described operation of the tractor 102.

The operation system 101 for the working machine is one that is adapted to require user registration in order to obtain the above-described mobile-use ID code, and then after the completion of the user registration, transmit the ID code from the management server 103 to a desired mobile terminal 104. Note that the user registration refers to registering (storing) information on a user who uses the tractor 102 or has purchased the tractor 102 in the management server 103.

The management server 103 is installed in the manufacturing company that manufactures the tractor 102, a sales company that sells the tractor 102, a rental company that rents the tractor 102, a finance company that pays for the tractor 102 in place of the user, or another companies. That is the management server 103 is installed in a company that requires the user registration.

As illustrated in FIG. 7, in the present embodiment, detailed description is provided on the assumption that the management server 103 is installed in the manufacturing company.

The management server 103 is provided with: user information storage means 150 adapted to store various pieces of information on the user registration; and ID code transmitting means 151 adapted to, after completion of the user registration, transmit the mobile-use ID code to the mobile terminal 104. The user information storage means 150 is configured to include a database and the like, and the ID code transmitting means 151 is configured to include a program and the like stored in the management server 103.

The database 150 mainly stores pieces of information on tractors 102 (pieces of tractor information) and pieces of information on users (pieces of user information) with respectively relating the pieces of tractor information and the pieces of user information to each other. As illustrated in FIG. 9, the database 150 stores, as the pieces of tractor information, working machine-use ID codes for respectively identifying tractors 102. Also, the database 150 stores, as the pieces of user information, mobile-use ID codes, and names, addresses, mail addresses of mobile terminals 104, and phone numbers of the mobile terminals 104 of the users, and the like. The user registration is adapted to relate tractor information and corresponding user information to each other.

To make the user registration, after having purchased a tractor 102, a user uses a mobile terminal 104 to access the management server 103. On the management server 103 side of the manufacturing company, a registration format R is prepared, and to enable pieces of necessary information to be inputted in the registration format R, on a display screen of the mobile terminal 104, the registration format R is displayed.

Figure 10:
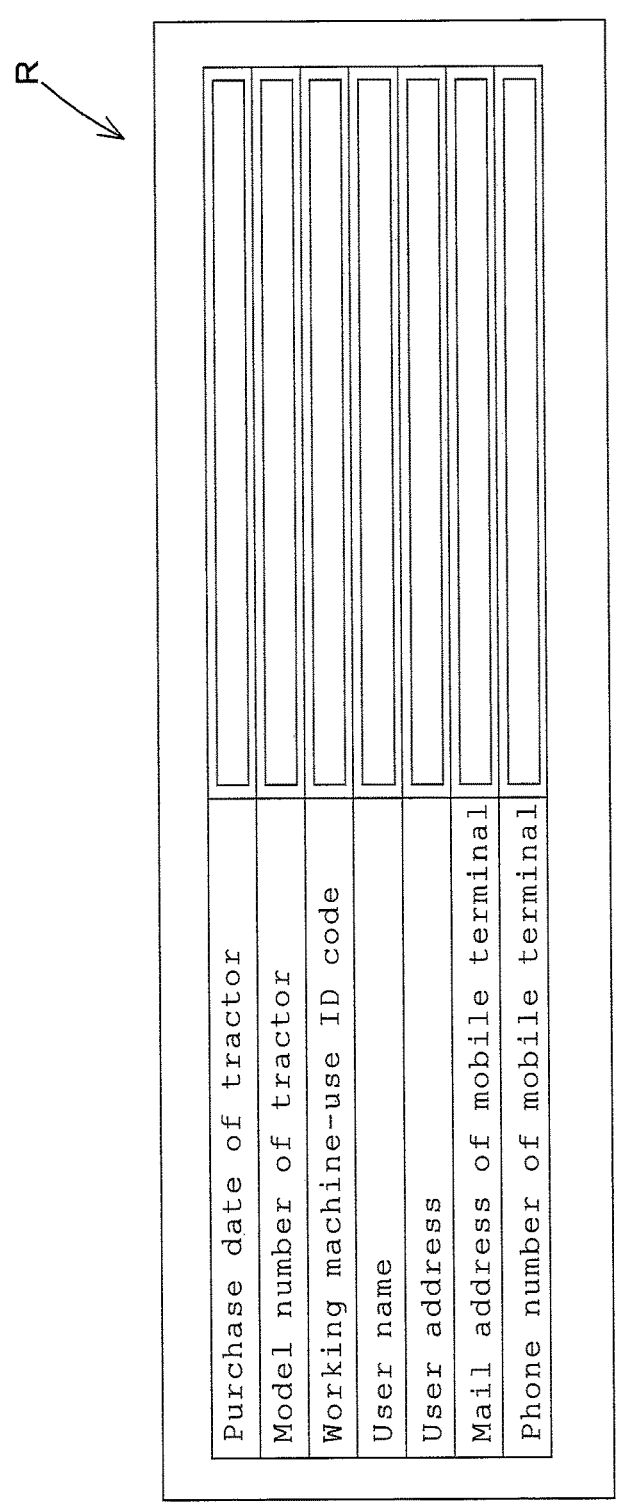
FIG. 10 is a diagram illustrating a registration format for the case of making user registration in a management server of a manufacturing company.

Specifically, as illustrated in FIG. 10, the registration format R is adapted to be able to be inputted with a purchase date of the tractor 102 that the user purchased, a model number of the tractor 102, a working machine-use ID code of the tractor 102, and a name, an address, a mail address of the mobile terminal 104, and a phone number of the mobile terminal 104 of the user. In addition, the working machine-use ID code of the tractor 102 is preferably informed from the manufacturing company after the purchase of the tractor 102, i.e., when the tractor 102 is paid for, and for example, the working machine-use ID code is preferably stated in an instruction manual, warranty, and/or user registration guidebook of the purchased tractor 102.

After such pieces of information have been inputted in the registration format R to complete the registration, in the management server 103, the purchase date of the tractor 102, the model number of the tractor 102, the working machine-use ID code of the tractor 102, and the name, address, mail address of the mobile terminal 104, and phone number of the mobile terminal 104, and the like of the user are stored with being related to one another.

Also, after the completion of the user registration, the management server 103 transmits a mobile-use ID code to the mobile terminal 104 related to the working machine-use ID code by the ID code transmitting means 151.

Figure 11:
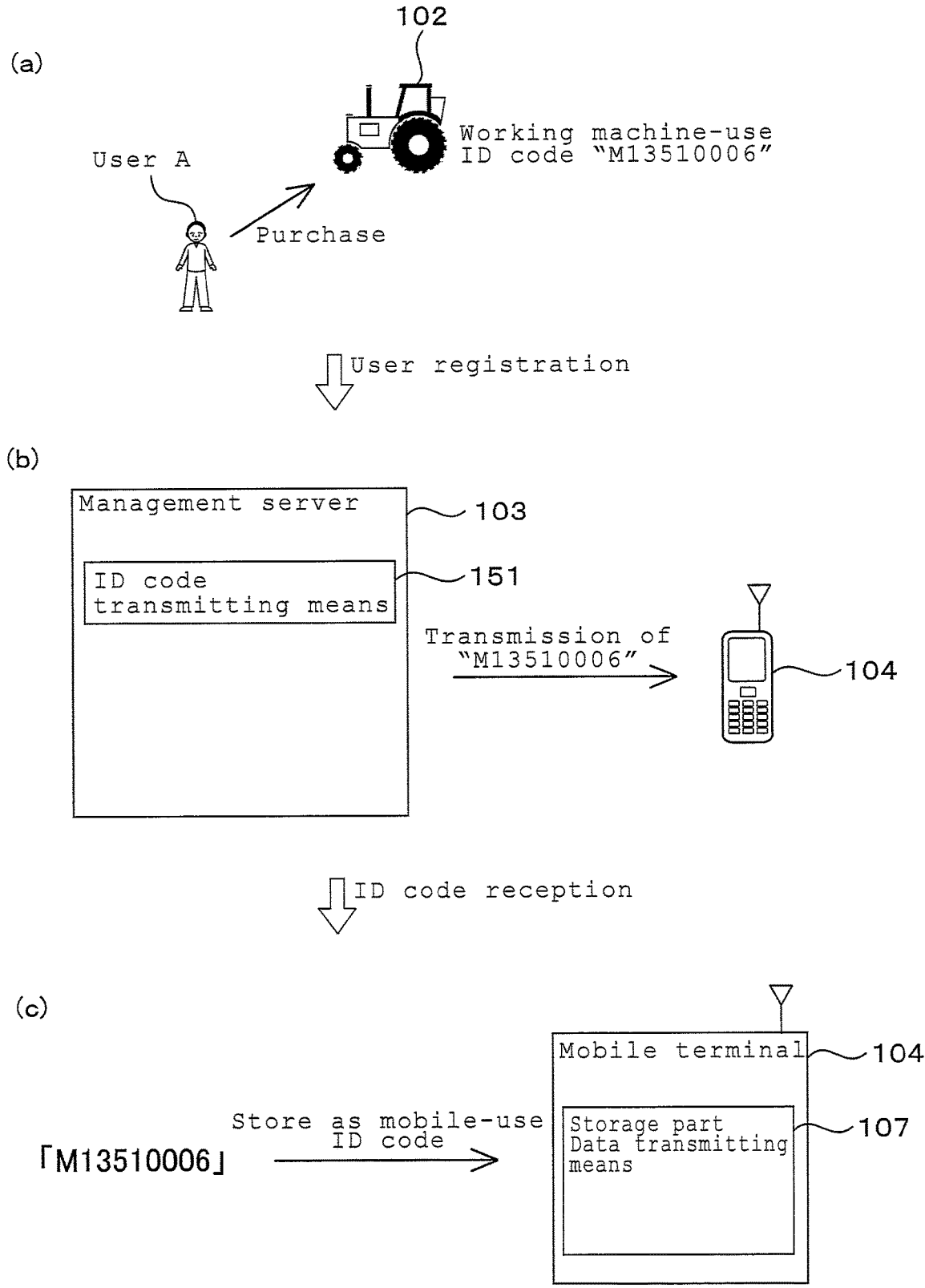
FIG. 11 is an explanatory diagram explaining a flow from purchasing the tractor to obtaining an ID code.

As illustrated in FIG. 11(a), it is assumed that after a user A has purchased a tractor 102 having a working machine-use ID code of "M13510006" from the manufacturing company, the user A accesses the management server 103 to make user registration. Then, as illustrated in FIG. 11(b), the ID code transmitting means 151 of the management server 103 transmits the same ID code ("M13510006") as the working machine-use ID code to a mobile terminal 104 that is registered in the user registration by the user A. As illustrated in FIG. 11(c), upon receipt of the ID code ("M13510006") transmitted from the management server 103, the mobile terminal 104 obtains the ID code as a mobile-use ID code, and stores the obtained mobile-use ID code in a storage part (data storage means 107). The mobile-use ID code from the management server 103 may be automatically obtained when the mobile-use ID code to be stored in the mobile terminal 104 itself is transmitted with communication with the outside being monitored. Alternatively, the present invention may be adapted to provide the mobile terminal 104 with an ID code obtaining mode in advance; operate the mobile terminal 104 to thereby put the mobile terminal 104 in the ID code obtaining mode; and only when putting the mobile terminal 104 in the ID code obtaining mode, obtain the mobile-use ID code.

In addition, the mobile terminal 104 can be identified by the mail address or phone number of the mobile terminal 104 inputted in the user registration. In the user registration, it is necessary to, in the management server 103, store information that identifies the mobile terminal 104; however, the information is not limited to the mail address or phone number of the mobile terminal 104, but may be any information as long as the information identifies the mobile terminal 104.

According to the present invention, unless user registration is made in the management server 103, a mobile-use ID code cannot be obtained, and therefore it becomes difficult for a third person other than a user who uses a working machine 102 to obtain an ID code for operating the working machine 102 and easily operate the working machine 102. For example, as described above, until after the purchase of the working machine 102 from the manufacturing company, with use of the mobile terminal 104 or the like, the management server 103 of the manufacturing company or the like is accessed to surely make the user registration, the working machine 102 cannot be operated, and therefore it is very difficult to operate the working machine 102 before the purchase of the working machine 102, so that the working machine 102 can be surely prevented from being stolen before selling (purchasing).

In the above embodiment, described is an example where the user registration is made in the management server 103 of the manufacturing company; however, the user registration may be made in the management server 103 of the rental company that rents the working machine 102.

Third Embodiment

The above-described second embodiment is adapted to, whenever matching between a mobile-use ID code and a working machine-use ID code is established, allow the normal control; however, a third embodiment is adapted to set an operation allowable time during which control (normal control) is allowed, and in the case where matching between ID codes is established within the operation allowable time, allow the control. The case of setting the operation allowable time is described in detail.

ID code obtaining means 140 also obtains the operation allowable time when a mobile-use ID code is transmitted from a mobile terminal 104. The operation allowable time is one that is transmitted from a management server 130, and set for each specific tractor 102.

Figure 12:
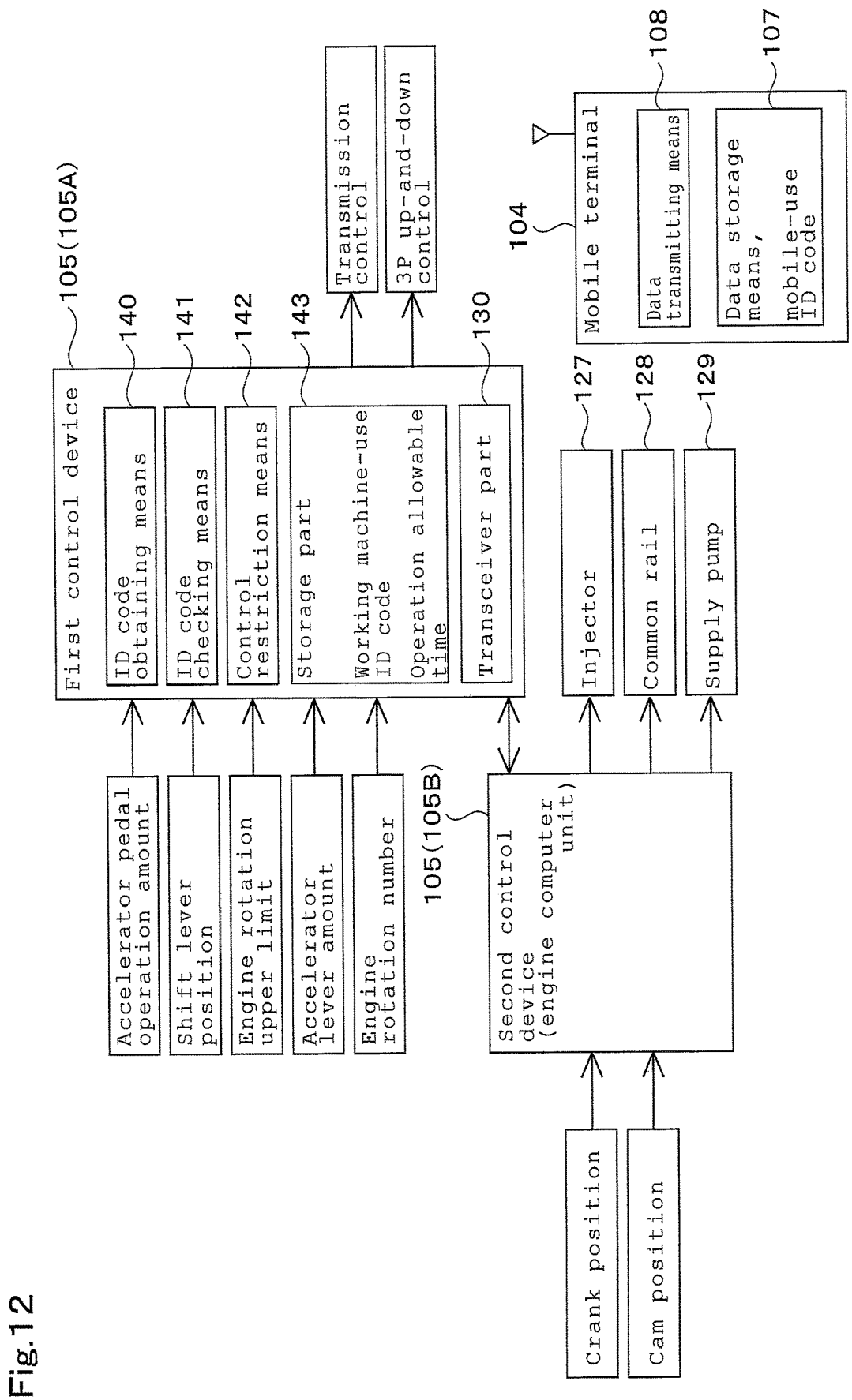
FIG. 12 is a control block diagram of a tractor in a second embodiment.

As illustrated in FIG. 12, a first control device 105A stores the obtained operation allowable time in a storage part 143 in the case where the obtained operation allowable time is for a working machine 102 (tractor 102) corresponding to the first control device 105A itself. In the case where the operation allowable time obtained from the mobile terminal 104 is for another tractor 102, or an operation allowable time has already been obtained and it is not necessary to newly obtain an operation allowable time, the first control device 105A does not store the operation allowable time. Note that the operation allowable time may be represented as a remaining time, or set as a period.

In the case where the operation allowable time is represented as a remaining time, after the first control device 105A has obtained the operation allowable time corresponding to the tractor 102 corresponding thereto, every time driving parts such as an engine 111, transmission 12, and three-point link mechanism 16 are driven, the first control device 105A decreases the operation allowable time to update the operation allowable time stored in the storage part 143.

For example, in the case where the first obtained operation allowable time is 100 hours, and the engine 111 has been operated for 30 hours, the updated operation allowable time (remaining operation allowable time) is 70 hours.

In the case where the operation allowable time (remaining operation allowable time) stored in the first control device 105A is not zero hours (within the operation allowable time), and matching between ID codes is established, control restriction means 142 outputs an allowance signal to enable the normal operation by respective control devices 105 to be performed. On the other hand, in the case where the operation allowable time (remaining operation allowable time) stored in the first control device 105A is zero hours (out of the operation allowable time), even in the case where the matching between ID codes is established, the control restriction means 142 does not output the allowance signal to disable the normal control by the respective control devices 105 from being performed.

Alternatively, in the case where the operation allowable time is set as a period, after the first control device 105A has obtained the operation allowable time (period) corresponding to the tractor 102 corresponding thereto, the control restriction means 142 allows the normal operation based on established ID code matching until the end of the operation allowable time (period) is reached. Also, in the case where the operation allowable time is set as a period, the control restriction means 142 allows the normal operation based on the established ID code matching until the period terminates.

For example, in the case where the operation allowable time is set as a period to "Jun. 30, 2011", the control restriction means 142 allows the normal control based on the established ID code matching until "Jun. 30, 2011", and in the case where the operation allowable time is set as a period of "1 June to 7 July, 2001", the control restriction means 142 allows the normal control based on the established ID code matching until "7 July, 2011" that is the last day of the period.

In the case of using the operation allowable time to restrict operation of the tractor 102, the management server 103 is preferably installed in a rental company or a finance company.

Figure 13:
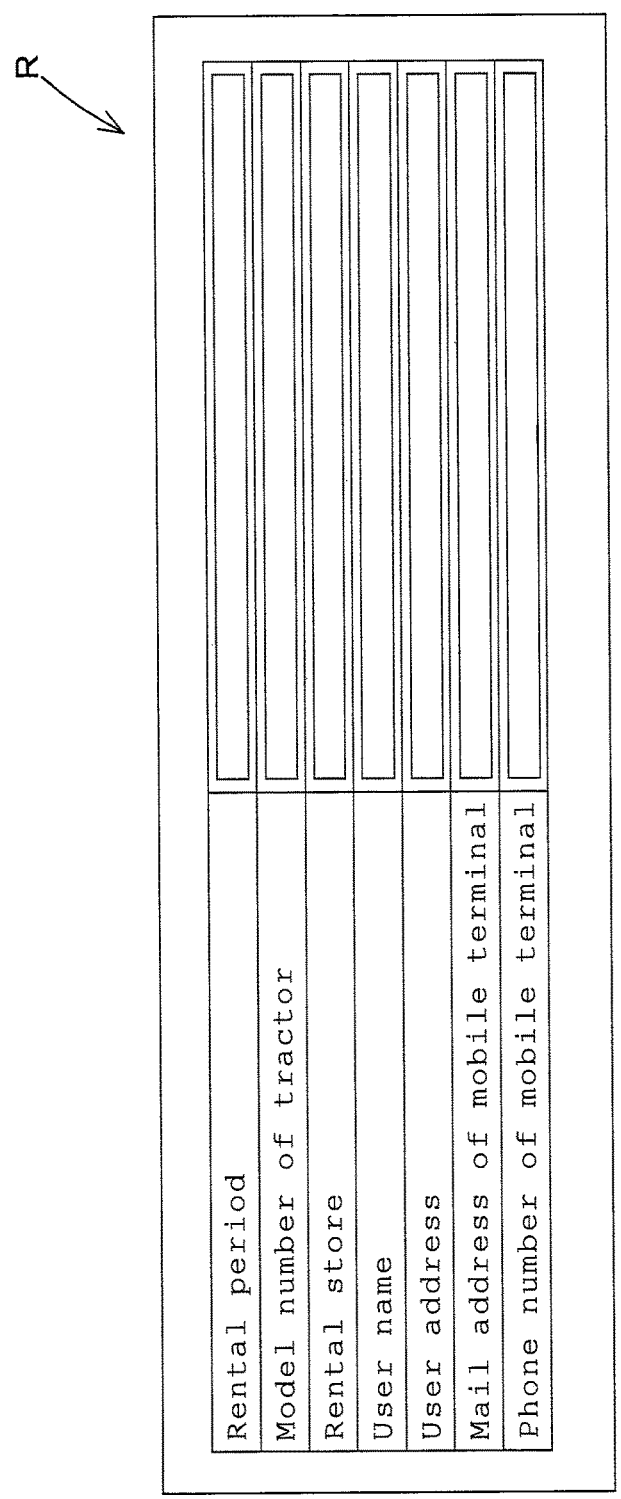
FIG. 13 is a diagram illustrating a registration format for the case of making user registration in a management server of a rental company.

In the case of installing the management server 103 in the rental company, a user makes user registration in the management server 103 of the rental company. As illustrated in FIG. 13, the user first uses a mobile terminal 104 to access the management server 103 of the rental company, and inputs pieces of tractor information in a registration format R, such as a period of a rental (rental period), a model number of a tractor 102, and a store that rents the tractor 102 (rental store). Also, the user inputs pieces of user information such as a name, address, mail address of the mobile terminal 104, and phone number of the mobile terminal 104 of the user.

After the input of the pieces of tractor information and the pieces of user information has been completed, the management server 103 of the rental company extracts pieces of rental information on a rentable tractor 102 (such as a model number of the tractor 102, working machine-use ID code of the tractor 102 to be rented, rental period of the tractor 102, and rental store of the tractor 102) from the pieces of information in the registration format R inputted at the time of the user registration, and pieces of information on tractors 102 stored in the management server 103. That is, the management server 103 searches whether or not any tractor 102 meeting the conditions inputted in the registration format R is present, and in the case where a tractor 102 meeting the conditions in the registration format R is present, informs the mobile terminal 104 of the user or the like of the pieces of rental information (such as the model number, rental period, and rental store of the tractor 102) excluding the working machine-use ID code.

After the user has checked the pieces of rental information informed from the management server 103 to the mobile terminal 104, and transmitted acceptance of the rental to the management server 103 through the mobile terminal 104, a rental agreement is established between the user and the rental company. After the rental agreement has been established, ID code transmitting means 151 of the management server 103 transmits the working machine-use ID code (ID code for the working machine to be rented) corresponding to the tractor 102, which is the subject of the rental agreement, to the mobile terminal 104 of the user as a mobile-use ID code. Also, the ID code transmitting means 151 transmits the rental period as the operation allowable time together with the mobile-use ID code.

Data storage means 107 of the mobile terminal 104 stores the working machine-use ID code (mobile-use ID code) and operation allowable time transmitted from the ID code transmitting means 151 of the rental management server 103 with relating the mobile-use ID code and the operation allowable time to each other.

For example, in the case of renting a tractor 102 of which the working machine-use ID code is "M13510006" and the rental period is "1 June to 7 July, 2011", the data storage means 107 of the mobile terminal 104 stores "M13510006" as the mobile-use ID code as well as storing "1 June to 7 July, 2011" as the operation allowable time. When the tractor 102 is started, the data transmitting means 8 of the mobile terminal 104 transmits, to the first control device 105A, "M13510006" as the mobile-use ID code as well as transmitting "1 June to 7 July, 2011" as the operation allowable time.

According to the present embodiment, in the case where matching between ID codes is established within a period of, for example, 1 June to 7 July, 2011, a tractor 102 currently rented can be operated. In the case where a rental period has passed, or the ID code matching is not established, the operation of the tractor 102 can be surely restricted.

Fourth Embodiment

In the third embodiment, the rental company is taken as an example to provide the description; however, in a fourth embodiment, a finance company that pays a purchase price of a tractor 102 in a lump sum in place of a user is taken as an example to provide a description.

Prior to the lump sum payment of the purchase price to a manufacturing company, as shown in FIG. 14, which is made by the finance company, a payment schedule for the user to make a payment in installments to the finance company is created. In the payment schedule, pieces of price payment information such as the number of installments paid to the finance company by the user, due dates, and payment amounts are listed. In the finance company, user registration is made.

For example, in the finance company, i.e., in a management server 103 of the finance company, in a registration format R, in addition to a tractor 102 purchase date when the user purchased the tractor 102, a model number of the tractor 102, a working machine-use ID code of the tractor 102, a name, an address, a mail address of a mobile terminal 104, and a phone number of the mobile terminal 104 of the user, the pieces of payment information listed in the payment schedule are inputted to complete the user registration.

After the user registration has been first completed, ID code transmitting means 151 of the management server 103 of the finance company transmits a first due date to the mobile terminal 104 as an operation allowable time as well as transmitting the working machine-use ID code as a mobile-use ID code. Upon receipt of the mobile-use ID code and the operation allowable time as described above, the mobile terminal 104 stores the mobile-use ID code and the operation allowable time in a storage part.

In the case where the user pays the predetermined payment amount by the due date, the management server 103 of the finance company regards the user registration as being made again (not actually made), and transmits the working machine-use ID code as the mobile-use ID code as well as transmitting a new due date as the operation allowable time to the mobile terminal 104. Upon receipt of the new operation allowable time, the mobile terminal 104 updates the already stored operation allowable time.

According to the present embodiment, in the case where matching between the ID codes is established during a period during which the user repeatedly makes the payment, the user can operate the tractor 102 for which the user continues to make the payment. In the case where the payment is overdue and any of the due dates has passed, or the matching between the ID codes is not established, the tractor 102 can be surely restricted from being operated. In addition, when the last payment is completed, the management server 103 of the finance company preferably sets the operation allowable time to a very large value (e.g., a few hundred years or more) to thereby enable the tractor 102 to be used for a long period of time regardless of payment.

According to the present invention as described above, in any of the manufacturing company that manufactures the working machine, the rental company that rents the working machine, and the finance company that pays for the working machine in a lump sum in place of a user, unless user registration is made to obtain an ID code for operating the working machine, the working machine cannot be operated, and therefore the working machine can be prevented from being operated by a third person other than the user. In particular, the ID code for operating the working machine is transmitted to a mobile terminal that the user possesses, and therefore a third person can be prevented from using the ID code to operate the working machine.

Further, in the case of providing an operation allowable time that allows the working machine to be operated, even the user can operate the working machine only for the allowed time. In this case, in particular, in a situation where the rental company rents the working machine to the user, or the finance company makes a payment for the working machine in place of the user, the condition for the operation can be applied to even the user.

In the above-described embodiment, the tractor is taken as an example to provide the description; however, the working machine may be a backhoe, combine harvester, transplanter, or the like. The timing to check the ID codes by the ID code checking means 141 is preferably timing when the working machine 102 is used, for example, an engine 111 is started; however, the ID code checking is only required to be performed when a user or the like uses the working machine 102, and the timing is not limited to the starting time of the engine 111.

Fifth Embodiment

Figure 16:
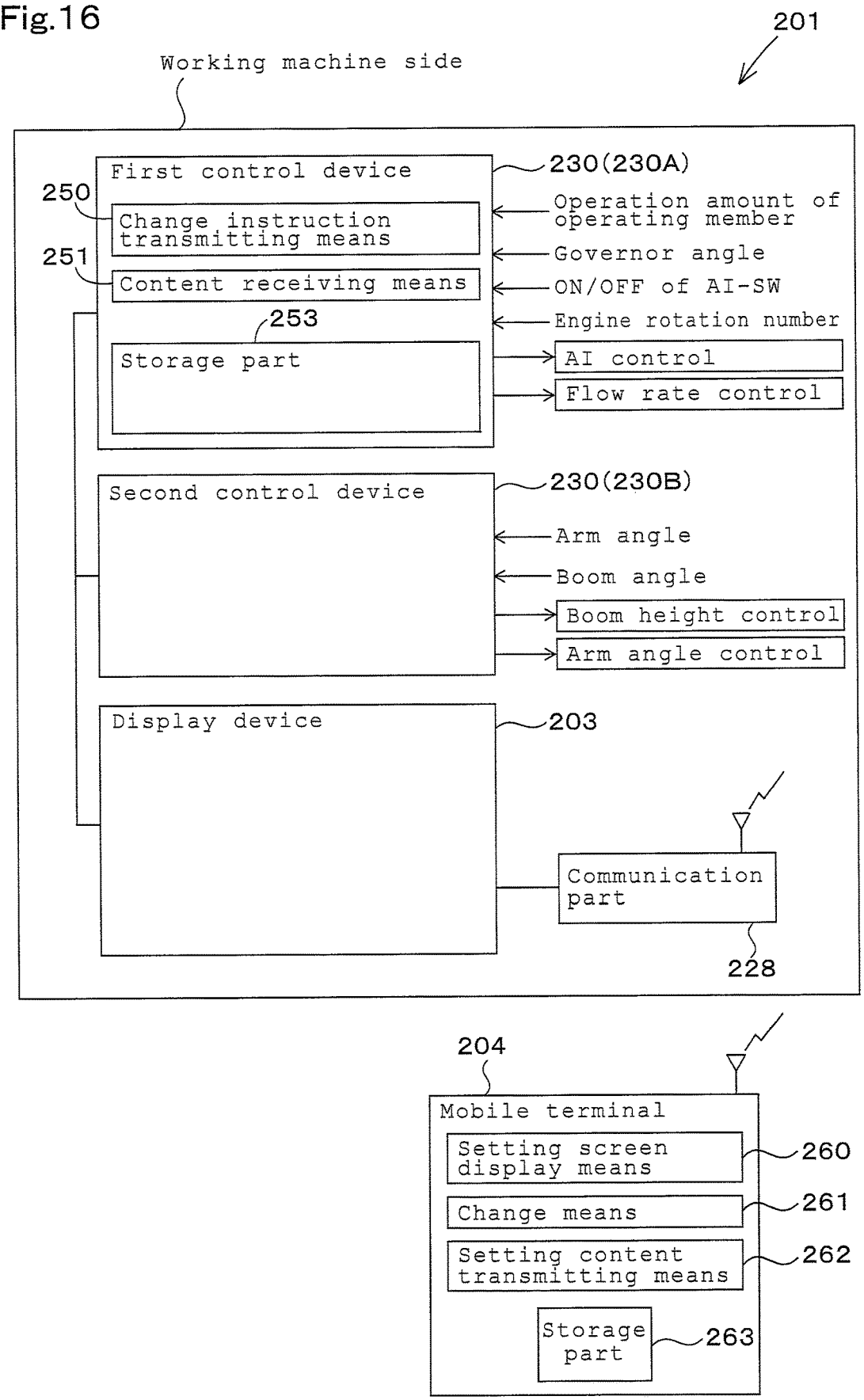
FIG. 16 is an overall view of a setting change system for a working machine.

FIG. 16 illustrates an overall view of a setting change system for a working machine.

The setting change system 201 for a working machine is one that enables after-mentioned control devices 230 to make and change various settings of a working machine 202 through a display device 203 installed in the working machine 202, and also enables the control devices 230 to make and change the various settings of the working machine 202 even with use of another mobile terminal 204 different from the display device 203.

The mobile terminal 204 is one that can make wireless communication with the display device 203 and the like. The mobile terminal 204 is a wireless device that can, through the mutual wireless communication with the display device 203, transmit data of the mobile terminal 204 to the display device 203, and receive data from the display device 203. The data communication between the mobile terminal 204 and the display device 203 enables settings of the working machine 202, which are set on the display device 203, to be transmitted to the mobile terminal 204, and settings set with the mobile terminal 204 in place of the display device 203 to be transmitted to the display device 203. In addition, the display device 203 is connected with a communication part (transceiver part) 228 for making the wireless communication with the mobile terminal 204, and can thereby make the data communication through the transceiver part.

Such a mobile terminal 204 is a PDA (Personal Data Assistance), a tablet PC, or the like that is easily carried and can make wireless communication, and includes a smartphone or mobile phone having a telephone function.

Next, a backhoe is taken as an example to describe the working machine 202 in detail.

Figure 23:
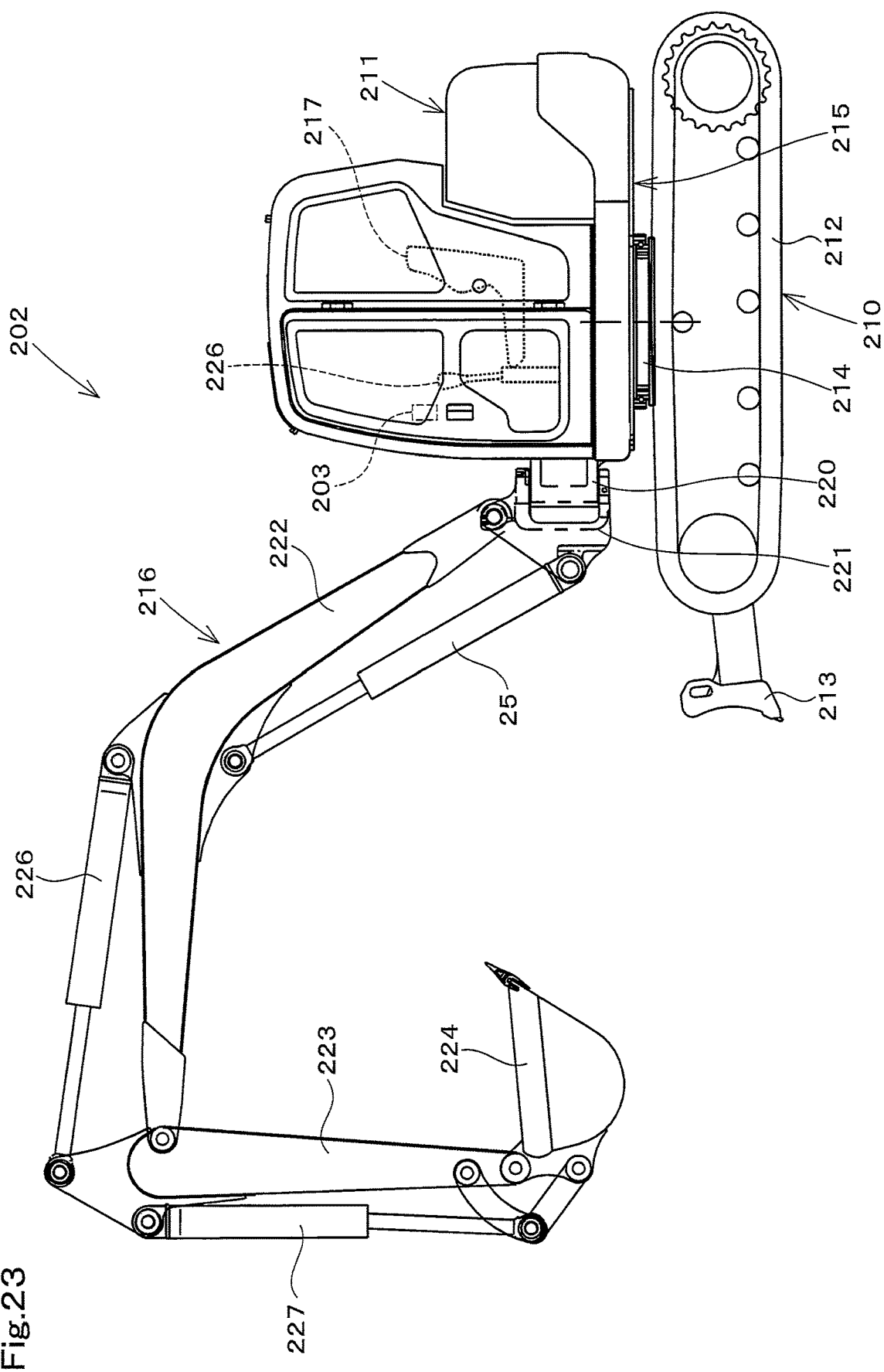
FIG. 23 is an overall view of a backhoe.

As illustrated in FIG. 23, the backhoe 202 is provided with a traveling unit 210 as a lower unit and a revolving body 211 as an upper unit.

As the traveling unit 210, a crawler type traveling unit that is adapted to be provided with a left and right pair of traveling bodies 212 respectively having crawlers made of rubber, and drive the both traveling bodies 212 with a traveling motor is employed. Also, a front part of the traveling unit 210 is provided with a dozer 213.

The revolving body 211 has: a revolving base 215 that is supported on the traveling unit 210 through a revolving bearing 214 so as to be revolvable left and right around a vertical revolving pivot; and a working unit 216 (excavating unit) that is provided at a front part of the revolving base 215. On the revolving base 215, an engine, radiator, driver's seat 217, fuel tank, operating oil tank, and the like are provided.

In front of the driver's seat 217, a display device 203 that can display various pieces of information on the backhoe and also make various settings of the backhoe is installed (fixed).

The working unit 216 is provided with: a swing bracket 221 that is supported by a support bracket 220 provided at the front part of the revolving base 215 with being offset slightly to the light of a horizontally central part so as to be swingable left and right around a vertical shaft center; a boom 222 that is vertically swingably supported by the swing bracket 221 with a base part side thereof being pivotally attached to the swing bracket 221 so as to be rotationally movable around a horizontal shaft center; an arm 223 that is supported by a fore end side of the boom 222 so as to be swingable back and forth with being pivotally attached to the fore end side so as to be rotationally movable around a horizontal shaft center; and a bucket 224 that is provided on a fore end side of the arm 223 so as to be operable in a scooping/dumping manner.

The swing bracket 221 is swung by expansion and contraction of a swing cylinder that is provided inside the revolving base 215; the boom 222 is swung by expansion and contraction of a boom cylinder 225 that is set between the boom 222 and the swing bracket 221; the arm 223 is swung by expansion and contraction of an arm cylinder 226 that is set between the arm 223 and the boom 222; and the bucket 224 is subjected to the scooping/dumping operation by expansion and contraction of a bucket cylinder 227 that is set between the bucket 224 and the arm 23. In addition, the various types of actuators such as the swing cylinder, boom cylinder 224, arm cylinder 226, and bucket cylinder 227 are adapted to operate through control valves that can supply the operating oil to the respective actuators. Also, a pilot pressure on each of the control valves is adjusted by an operation of an after-mentioned operating member, an electromagnetic proportional valve, and the like, and thereby a flow rate of the operating oil toward the control valve is changed.

As illustrated in FIG. 16, the backhoe 202 is provided with the control devices 230 for controlling the backhoe 202, and the control devices 230 and the display device 203 are adapted to be able to make mutual communication (data exchange) through an in-car communication network such as CAN (Controller Area Network) or FlexRay.

The control devices 230 in the present embodiment perform various types of control such as auto-idle control (AI control), flow rate control, boom height control, and arm angle control.

The display device 203 is adapted such that settings (on/off of each control and setting values) having been already set can be changed thereon, such as a change in setting (on/off setting of each control) indicating whether or not each control in the control devices 230 should be operated, and a change in setting value such as an upper limit or a lower limit in each control.

Next, each control in the control devices 230, and the changes in settings on the display device 203 are described. Note that each control performed by any of the control devices 230 in the working machine 202 such as the backhoe 202 is not limited to any of various types of control described below.

The AI control or the flow rate control is performed by one of the control devices, which is configured to include a CPU and the like (referred to as a first control device) 230A. The first control device 230A is inputted with various types of control signals such as operation amounts of the operating members (e.g., an operation lever 233 and an operation switch) for operating the various types of actuators such as the swing cylinder, boom cylinder 224, arm cylinder 226, and bucket cylinder 227, a governor angle (governor position) from a governor sensor, an operation amount (angle) of an accelerator lever, an on signal/off signal of an idle-switch (AI-SW), and an engine rotation number from an engine rotation sensor.

The AI control is one that, when the operating members for operating the arm 223 (arm cylinder 226), boom 220 (boom cylinder 224), and the like are operated, increases/decreases the engine rotation number according to the accelerator lever operation amount, and when the operating members are not operated, fixes the engine rotation number to that in an idling state.

Specifically, in the AI control by the first control device 230A, when the operation layer 233 is placed in a neutral position to input the on signal of the idle-switch, regardless of the accelerator lever operation amount, an idle signal is outputted to an auto-idle motor to drive the auto-idle motor, and the engine rotation number is controlled to the idling rotation number. Also, in the AI control by the first control device 230A, when the operation lever 233 is swung back and forth or left and right to input the off signal of the idle-switch, an operation signal is outputted to the auto-idle motor on the basis of an accelerator position signal to drive the auto-idle motor. When the auto-idle motor is driven, the governor lever is operated to control the engine rotation number to a rotation number corresponding to the accelerator lever.

The flow rate control is one that operates the actuators according to the operation amounts of the operating members.

In the flow rate control by the first control device 230A, for example, when the operation lever 233 is swung from the neutral position toward one side (left side) to input a left side operation amount, current having a predetermined value (operation signal) is outputted to a solenoid of an electromagnetic proportional valve corresponding to an operated actuator. By doing so, the electromagnetic proportional valve is opened according to the current value, and a pilot pressure of a control valve corresponding to the operated actuator is controlled to operate the actuator toward one side. In addition, when the operation lever 233 is swung from the neutral position toward aside opposite to the above side to input a right side operation amount, the actuator is operated toward aside opposite to the side corresponding to the left side swing.

The boom height control and the arm angle control are performed by a control device (second control device) 230B different from the first control device 230A. The second control device 230B is inputted with various types of control signals such as control signals respectively indicating an arm angle and a boom angle.

The boom height control is one that, when a height of the boom 222 becomes a preset upper limit of the boom height, regardless of an operation of the operation lever 233, stops an upward operation of the boom 222. In the control by the second control device 230B, the height of the boom 222 is replaced by the boom angle, and on the basis of the boom angle, the height of the boom 222 is determined. Specifically, in the boom height control by the second control device 230B, when the boom 222 is subjected to the upward operation by the operation lever 233, the boom angle is inputted to the second control device 230B. Then, when the boom angle inputted to the second control device 230B reaches an upper limit, the second control device 230B stops the upward operation of the boom by demagnetizing a solenoid of an electromagnetic proportional valve or an electromagnetic valve for supplying a pilot pressure (pilot oil) to a control valve for supplying the operating oil to the boom cylinder 224.

The arm angle control is one that, when the arm angle reaches a predetermined upper limit or lower limit of the arm angle, regardless of an operation of the operation lever 233, stops a scooping operation of the arm 223. Specifically, in the arm angle control by the second control device 230B, when the arm 223 is subjected to the scooping operation by the operation lever 233, the arm angle is inputted to the second control device 230B. Then, when the arm angle inputted to the second control device 230B reaches the upper limit or lower limit, the second control device 230B stops the scooping operation of the arm 223 by demagnetizing a solenoid of an electromagnetic proportional valve or an electromagnetic valve for supplying a pilot pressure (pilot oil) to a control valve for supplying the operating oil to the arm cylinder 226.

The display device 203 is adapted to be inputted with pieces of information (data) on the working machine 202. That is, the display device 203 is adapted to be inputted with the pieces of data inputted to the first control device 230A and the second control device 230B through the CAN communication, and in addition, inputted with pieces of data such as setting values necessary for display or setting.

Figure 17:
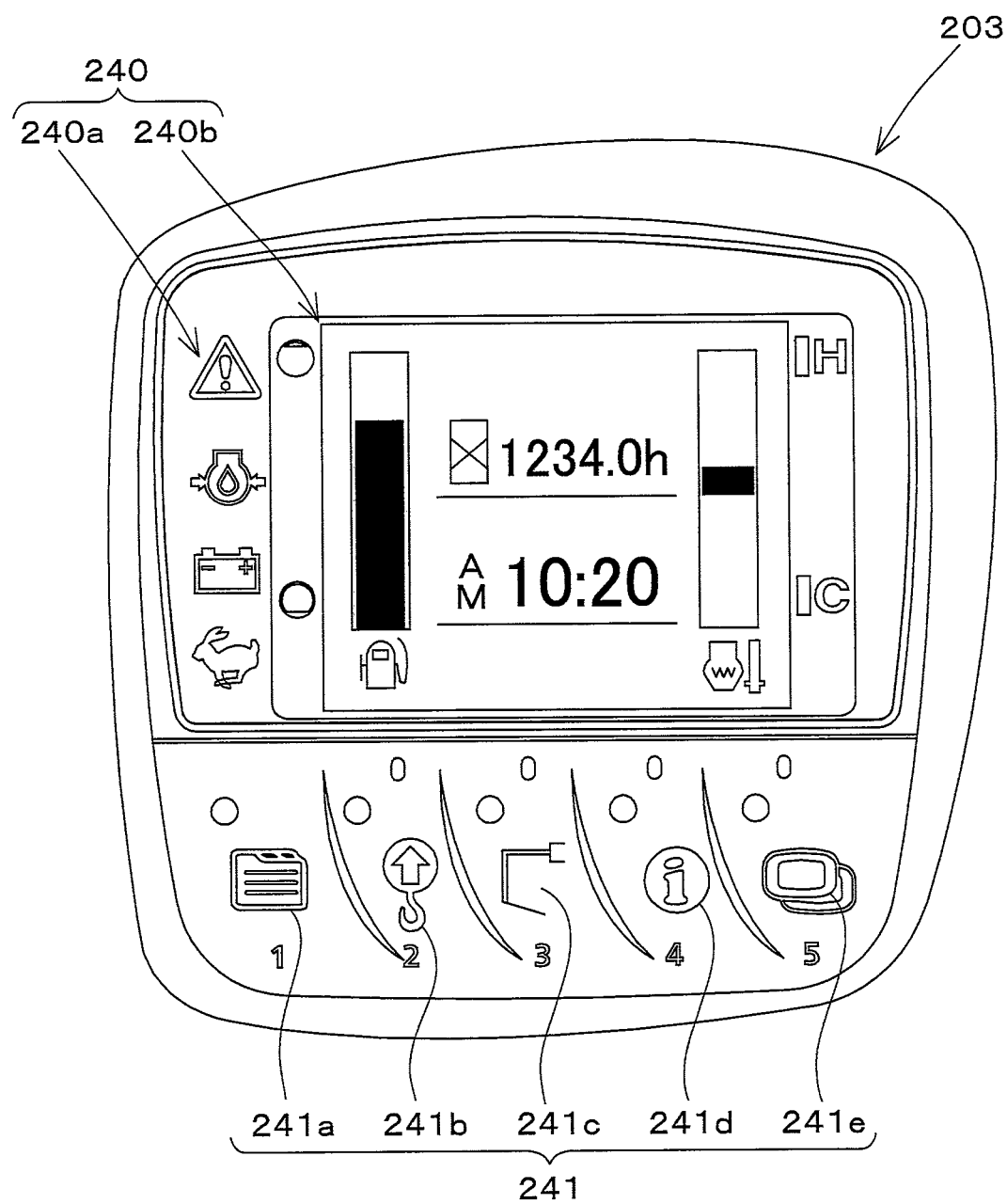
FIG. 17 is a front view of a display part of a display device.

FIG. 17 is a diagram in which a display part of the display device 203 is viewed from a front side.

The display part 240 of the display device 203 is configured to include: a fixed display part 240a that indicates a state of the backhoe 202 on the basis of lighting or extinction of lamps such as LEDs; and a liquid crystal display part (variable display part) 240b that is configured to include a liquid crystal and the like and displays various pieces of information by making a display variable. Also, the display part 240 is provided with a plurality of switches 241, and by operating the switches 241, various operations can be performed.

The display device 203 has: a normal screen mode that is seen when an operator or the like operates the backhoe 202; and a setting screen mode that is seen when the operator or the like makes settings of the backhoe 202. A program that puts the display device 203 into the normal screen mode or the setting screen mode is stored in the control device 230, i.e., the first control device 230A or the second control device 230B, and by executing the program, the display device 203 is adapted to operate. This enables the settings to be changed by the control device 230 through the display device 203. In addition, the program that puts the display device 203 into the normal screen mode or the setting screen mode, i.e., the program for changing the settings may be stored in the display device 203.

In the normal screen mode, as illustrated in FIG. 17, on the liquid crystal display part 240b of the display device 203, the pieces of information (drive information) on the backhoe 202, such as a fuel (remaining amount) outputted from a fuel sensor, a water temperature outputted from a water temperature sensor, and the engine rotation number. Note that the normal screen mode is only required to display information that is necessary for the operator to operate the backhoe 202, but, of course, not limited to one illustrated in FIG. 17. For example, in the normal screen mode, the liquid crystal display part 240b may be adapted to display a flow rate of the operating oil that, when a figure indicating an equipped attachment or the operating lever is operated, flows through a corresponding one of the actuators.

Figure 18:
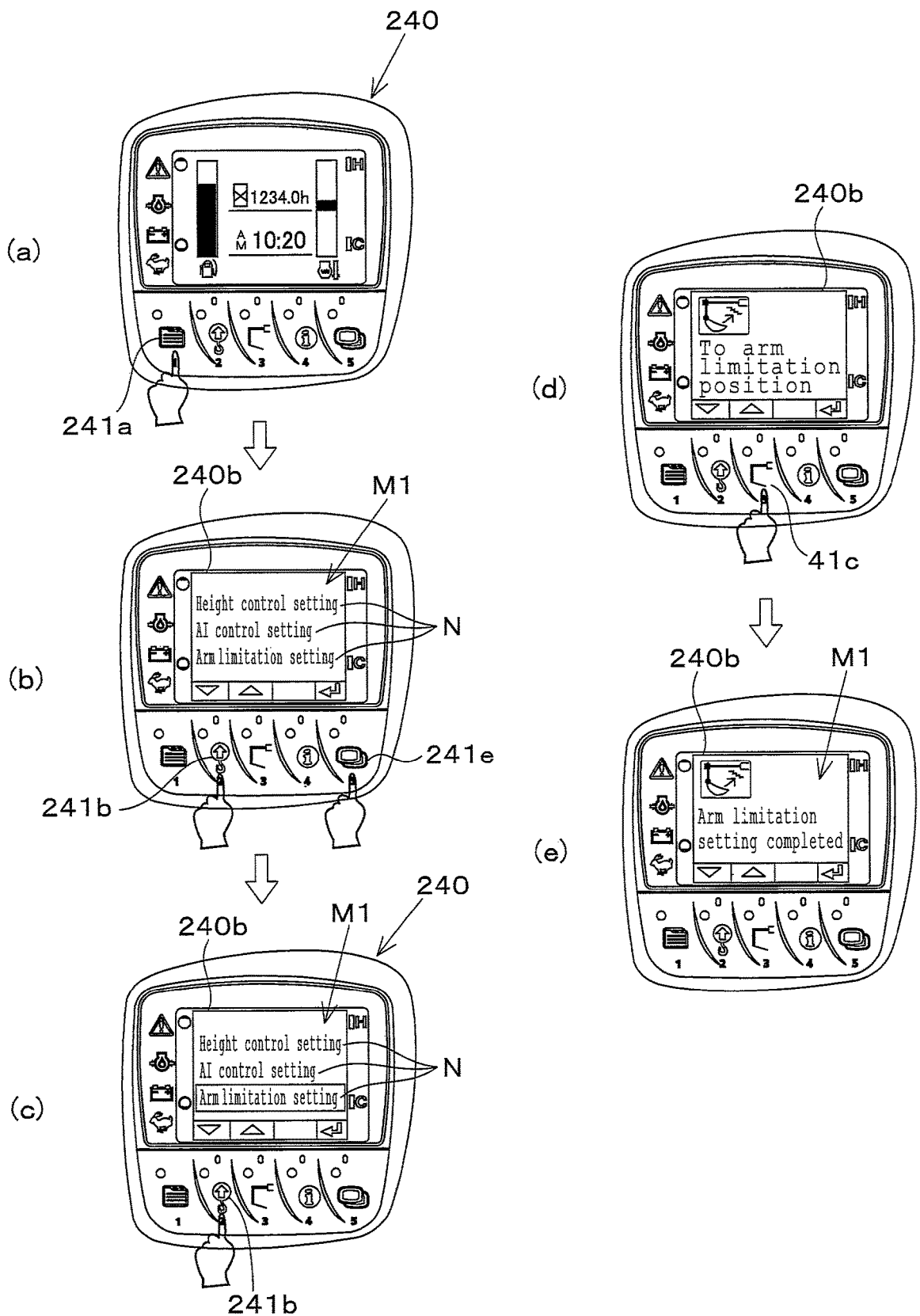
FIG. 18 is a screen transition diagram of the display device in the case of changing a setting value of an upper limit or lower limit of an arm angle.
Figure 19:
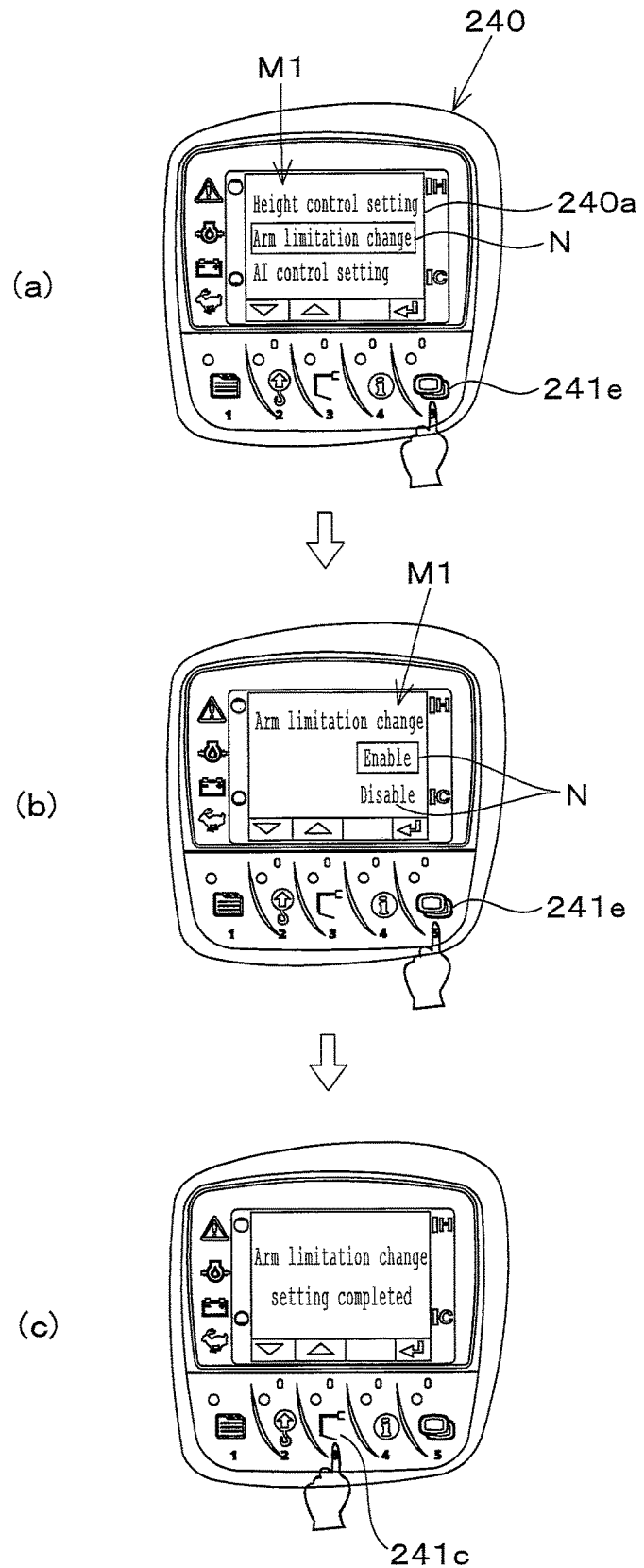
FIG. 19 is a screen transition diagram of the display device in the case of changing a setting that enables or disables arm angle control.
Figure 20:
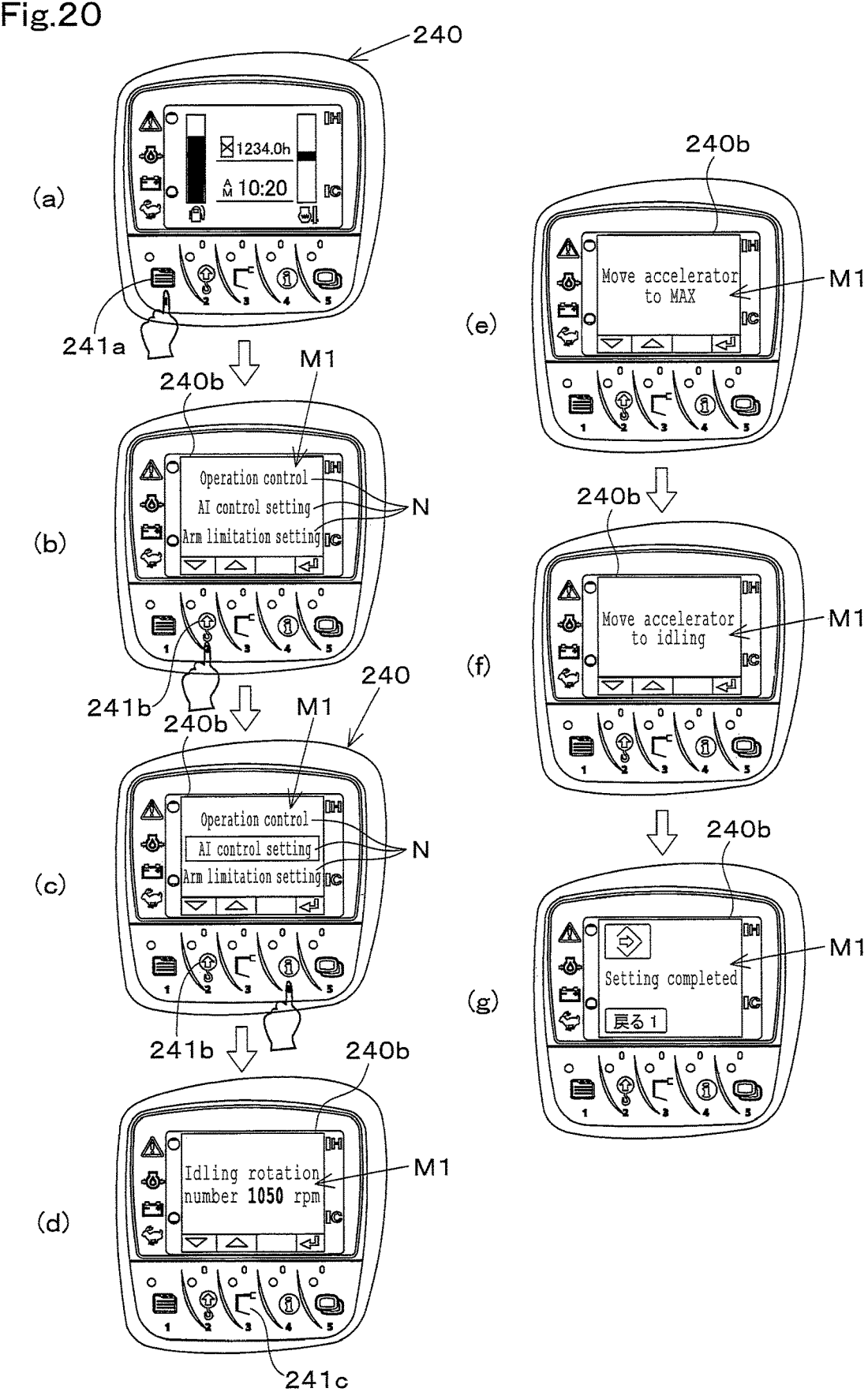
FIG. 20 is a screen transition diagram of the display device in the case of changing an idling rotation number in AI control.

FIGS. 18 to 20 are diagrams exemplifying a method for switching the display device 203 to the setting screen mode to change the settings of the backhoe 202.

FIG. 18 illustrates a screen transition of the display device 203 in the case of changing a setting value of the upper limit or lower limit of the arm angle used for the arm angle control.

To change the upper limit or lower limit of the arm angle, first, as illustrated in FIG. 18(a), in a state where the display device 203 is in the normal screen mode, a first switch 241a is pressed. By doing so, the display device 203 is switched from the normal screen mode to the setting screen mode, and as illustrated in FIG. 18(b), the liquid crystal display part 240b is switched to a setting screen M1 for making settings. On the setting screen M1, a plurality of items N to be set (setting items) are displayed, and every time the second switch 241b is pressed, a setting item to be selected can be changed by scrolling. By pressing a fifth switch 241e, a setting item N can be determined.

In the case of setting the upper limit or lower limit of the arm angle, as illustrated in FIG. 18(c), on the setting screen M1, a setting item N of "Arm limitation setting" is selected. By doing so, as illustrated in FIG. 18(d), on the setting screen M1, a guide display that provides guidance so as to bring the arm to a position desired to be newly set (limitation position) is provided, and by operating the arm with the operation lever to bring the arm to the desired upper limit position or lower limit position, and then pressing a third switch 241c, the upper limit or lower limit of the arm angle can be changed.

After the setting of the upper limit, lower limit, or the like of the arm angle has been completed, as illustrated in FIG. 18(e), on the setting screen M1, a display indicating that the arm limitation setting has been completed is provided. The changed setting value (the upper limit or lower limit of the arm angle) is stored in a storage part 253 provided in any of the first control device 230A, second control device 230B, and display device 203. The control device 230 (30B) changes the arm angle setting according to the upper limit or lower limit of the arm angle stored in the storage part 253.

FIG. 19 illustrates a screen transition of the display device 203 in the case of making a setting that enables or disables the arm angle control.

In the case of enabling or disabling the arm angle control, first, a special operation of, while pressing the first switch 241a, rotating an engine starting cylinder provided in the backhoe 202 to turn an ignition key from off to on is performed. By doing so, as illustrated in FIG. 19(a), the display device 203 is put into the setting screen mode; the liquid crystal display part 240b is switched to the setting screen M1; and the plurality of setting items N are displayed on the setting screen M1. Then, from among the setting items N, "Arm limitation change" is selected, and the fifth switch 241e is pressed.

By doing so, as illustrated in FIG. 19(b), on the setting screen M1, an item that enables the arm angle control and an item that disables the arm angle control are displayed. By selecting "Enable" or "Disable" on the setting screen M1, and pressing the fifth switch 241e, the arm angle control can be enabled or disabled. The setting of enabling or disabling the arm angle control is stored in the storage part 253. The control device 230 (30B) changes the arm angle setting according to the setting of enabling or disabling the arm angle control, which is stored in the storage part 253.

FIG. 20 illustrates a screen transition of the display device 203 in the case of changing the idling rotation number in the AI control.

To change the idling rotation number, first, as illustrated in FIG. 20(a), in a state where the display device 203 is in the normal screen mode, the first switch 241a is pressed to switch the display device 203 from the normal screen mode to the setting screen mode, and as illustrated in FIG. 20(b), the liquid crystal display part 240b is switched to the setting screen M1. Then, as illustrated in FIG. 20(c), on the setting screen M1, a setting item N of "AI control" is selected. By doing so, as illustrated in FIG. 20(d), the setting screen M1 is switched to a screen for setting the idling rotation number, and by operations of some of the switches 241 and the like, a value of the idling rotation number displayed on the setting screen M1 is changed (increased/decreased). Then, by pressing the third switch 241c, the changed value (setting value) of the idling rotation number displayed on the setting screen M1 is set as a new idling rotation number.

After the idling rotation number has been changed on the setting screen M1, as illustrated in FIG. 20(e), a guide display that provides guidance so as to move the accelerator (accelerator lever) to a maximum (MAX) position is provided on the setting screen M1. Then, by moving the accelerator to the maximum position, as illustrated in FIG. 20(f), a guide display that provides guidance so as to move the accelerator to an idling position is provided on the setting screen M1. By moving the accelerator to the idling position, as illustrated in FIG. 20(g), a display indicating that the setting of the idling rotation number is completed is provided on the setting screen M1. The changed idling rotation number (setting value) is stored in the storage part 253. The control device 230 (230A) changes a setting of the AI control according to the idling rotation number stored in the storage part 253.

As described above, on the display device 203, the various settings in the backhoe 202 can be changed, such as the change in upper or lower limit of the arm angle, the switching whether to enable or disable the arm angle control, and the change in idling rotation number in the AI control. In other words, by executing the program stored in the control device 230 to operate the display device 203 as described above, the settings of the backhoe 202 can be changed by the control device 230.

As described above, in the present invention, not only through the display device 203 but also through the mobile terminal 204, the settings can be changed. In this regard, with use of the display device 203 and the mobile terminal 204, a description is provided in detail.

As illustrated in FIG. 16, the control device 230 (the first control device 230A or the second control device 230B) is provided with means adapted to change the settings through the display device 203.

Specifically, as the means adapted to change the settings, change instruction transmitting means 250 and content receiving means 251 are provided in the first control device 230A. Also, the content storage means (storage part) 253 adapted to store changed settings is provided in the first control device 230A. The change instruction transmitting means 250 and the content receiving means 251 are respectively configured to include programs and the likes stored in the first control device 230A.

The programs respectively constituting the change instruction transmitting means 250 and the content receiving means 251 are not only stored in the first control device 230A, but may also be stored in the second control device 230B or the display device 203. In other words, the second control device 230B or the display device 203 may be provided with the change instruction transmitting means 250 and the content receiving means 251.

In the following, with reference to FIG. 21 together with FIG. 16, the setting change through the display device 203 is described.

The change instruction transmitting means 250 is means adapted to transmit a change instruction signal that instructs the mobile terminal 204 to change settings.

Figure 21:
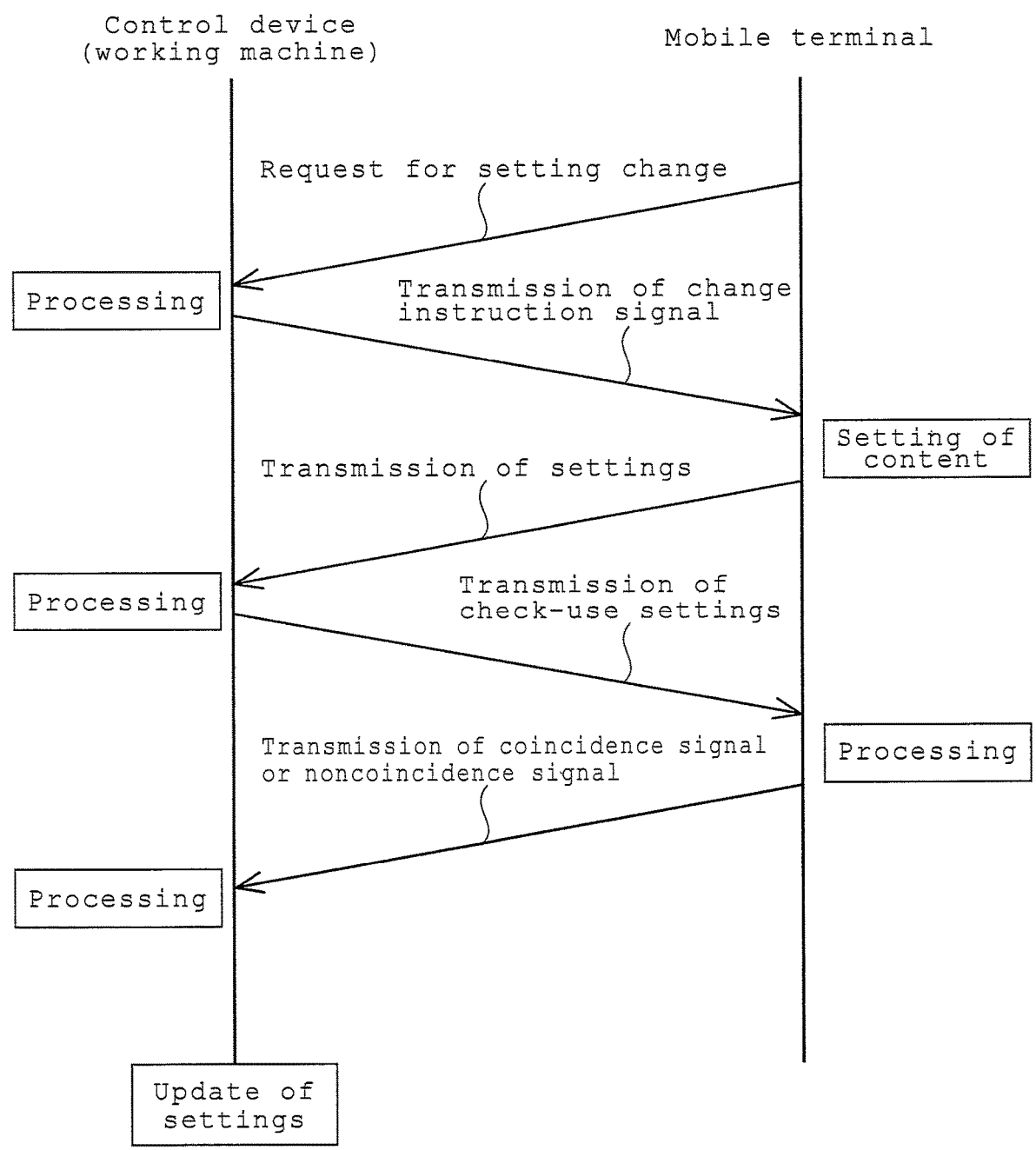
FIG. 21 is a diagram illustrating data communication between the control device and the mobile terminal.

As illustrated in FIG. 21, when the mobile terminal 204 is operated to make a request for a setting change from the mobile terminal 204 to the control device 230 through the display device 203 (transceiver part), upon request for the setting change from the mobile terminal 204, in the case of a situation where the setting change can be made, the change instruction transmitting means 250 transmits the change instruction signal.

For example, while the operation lever 233 or the acceleration lever is being operated, and the backhoe 202 is being operated by an operator, the change instruction transmitting means 250 does not transmit the change instruction signal to the mobile terminal 204 through the transceiver part. On the other hand, in a situation where the operation lever 233 or the accelerator lever is not operated, i.e., when the backhoe 202 is not operated, the change instruction transmitting means 250 transmits the change instruction signal to the mobile terminal 204. In addition, whether or not the backhoe 202 is in operation can be determined by sensor information or other information inputted to the control device 230.

When transmitting the change instruction signal to the mobile terminal 204, the change instruction transmitting means 250 may transmit settings already stored in the content storage means 253 together with the change instruction signal.

For example, on the display device 203, in the case where the settings such as the arm angle control being "Enable" and the idling rotation number being "1050 rpm" have already been stored in the content storage means 253 (the storage part of the display device 203), the same settings (the arm angle control is "Enable" and the idling rotation number is "1050 rpm") as the settings stored in the content storage means 253 are transmitted to the mobile terminal 204. By doing so, the setting values of the backhoe 202 can be checked on the mobile terminal 204 side, and while seeing the setting values already set on the backhoe 202 side, the setting values can be changed.

Also, in the case where the mobile terminal 204 does not have the program (setting control program) for displaying the setting screen M1 for changing the settings, the change instruction transmitting means 250 may transmit the setting control program through the display device 203 together with the change instruction signal.

For example, in the case where simultaneously with making the request for a setting change to the control device 230 (first control device 230A or second control device 230B) from the mobile terminal 204 through the display device 203, the mobile terminal 204 informs the change instruction transmitting means 250 of not having the setting control program, upon receipt of the informing, the change instruction transmitting means 250 transmits the setting control program to the mobile terminal 204. By doing so, even in the case where the mobile terminal 204 does not have the setting control program, the settings of the backhoe 202 can be made. In addition, when the setting control program is transmitted to the mobile terminal 204, the settings stored in the content storage means 253 may also be transmitted.

The content receiving means 251 (content obtaining means) is means adapted to receive (obtain) settings that have been changed on the mobile terminal 204 side in response to the change instruction signal. For example, in the case where on the mobile terminal 204 side, the setting screen M1 is displayed to complete setting of the backhoe 202, and the settings having been changed on the mobile terminal 204 side are transmitted to the content receiving means 251, as illustrated in FIG. 21, the content receiving means 251 receives the changed settings, which are transmitted from the mobile terminal 204, through the display device 203 to temporarily store the settings.

In the case where at the time of receiving the settings transmitted from the mobile terminal 204, for example, the backhoe 202 is in operation, and control processing by the control devices and display processing by the display device 203 are respectively in high load states, in order to give priority to the control processing and display processing, the content receiving means 251 does not continuously receive all of the settings, but intermittently receives the settings at intervals with dividing the settings.

Alternatively, in the case where the control processing and the display processing are respectively in the high load states, the content receiving means 251 once suspends receiving the settings, and when loads of the processing are decreased, requests the mobile terminal 204 to transmit the settings and then again receives the settings transmitted from the mobile terminal 204.

The content storage means 253 stores, as new settings, the settings changed on the mobile terminal 204 side. For example, when the backhoe 202 is not in operation, i.e., when the control processing and the display processing are respectively in low load states, as illustrated in FIG. 21, the content storage means 253 rewrites already stored settings to the new settings taken in by the content receiving means 251. In addition, during rewriting the settings, it is better to temporarily disable the backhoe 202 from being operated.

In the case of storing the settings received by the content receiving means 251 in the content storage means 253 as the new settings, it is preferable to check the settings received by the content receiving means 251 and the settings transmitted from the mobile terminal 204 with each other. For example, after the content receiving means 251 has received the settings, the received settings are sent back (transmitted) from the control device 230 to the mobile terminal 204 through the display device 203. For convenience of description, the settings sent back from the display device 203 (control device 230) is referred to as "check-use settings".

On the mobile terminal 204 side, the check use settings transmitted from the display device 203 (control device 230) and the settings (transmission-use settings) that are set in the mobile terminal 204 and transmitted to the display device 203 are checked with each other, and in the case where both of the settings coincide with each other, a coincidence signal indicating the coincidence of the settings is transmitted from the mobile terminal 204 to the control device 230 through the display device 203. On the content storage means 253 side, upon receipt of the coincidence signal, the settings already transmitted from the mobile terminal 204 are stored as the new settings.

In the case where the check-use settings and the transmission-use settings do not coincide with each other, the mobile terminal 204 transmits a noncoincidence signal indicating the noncoincidence of the settings to the control device 230 through the display device 203. On the control device 230 side, upon receipt of the noncoincidence signal, the settings already transmitted from the mobile terminal 204 are not stored as the new settings, and again the content receiving means 251 requests the mobile terminal 204 to transmit the settings (retransmission request), and the mobile terminal 204 again sends the settings upon the retransmission request. That is, between the display device 203 (control device 230) and the mobile terminal 204, it is checked whether or not both of the settings coincide with each other, and the above processing is repeated until both of the settings coincide with each other.

Figure 24:
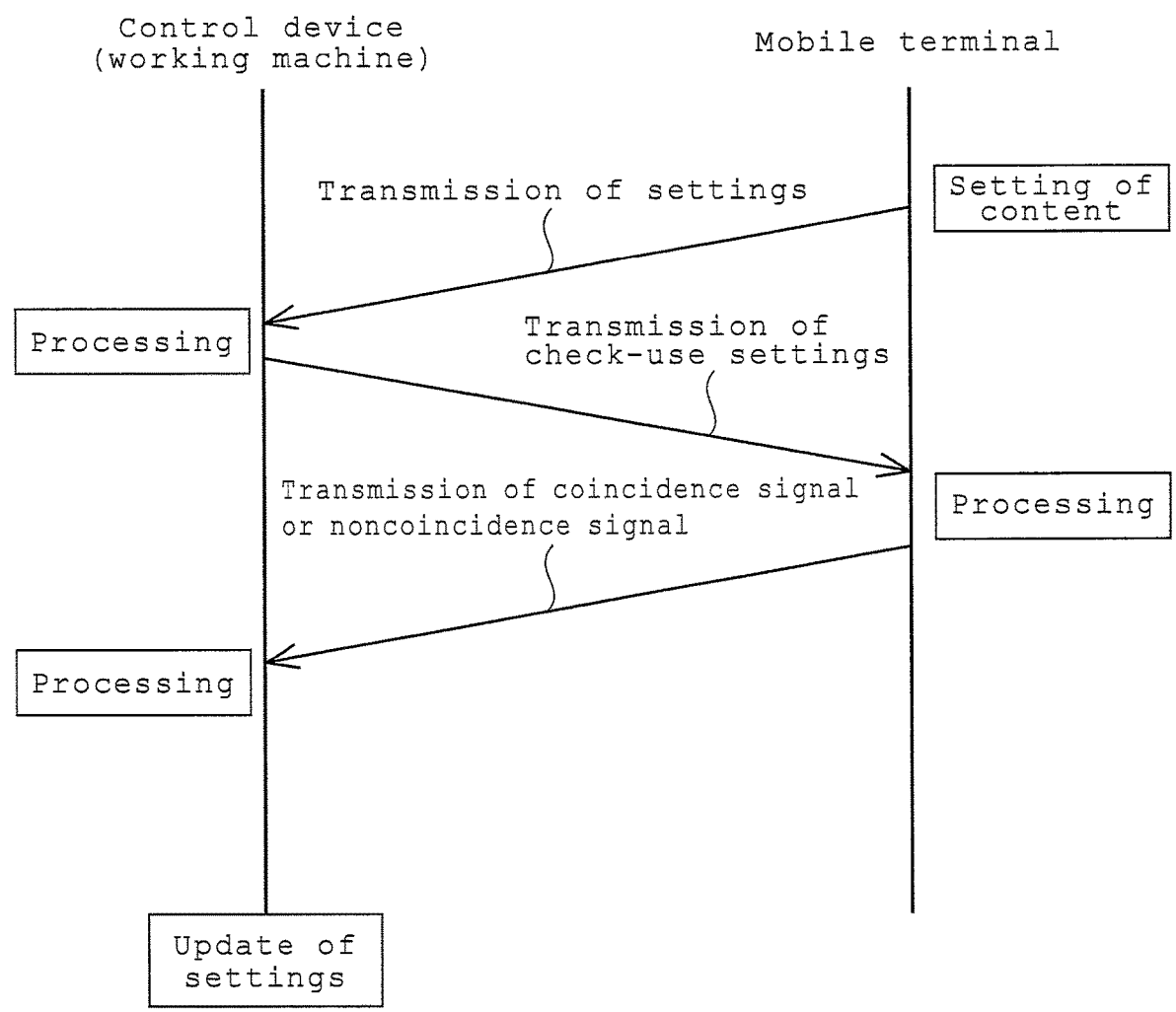
FIG. 24 is another diagram illustrating the data communication between the control device and the mobile terminal.

In addition, in FIG. 21, the setting change request is made from the mobile terminal 204 to the control device 230; then on the basis of the request from the mobile terminal 204, the control device 230 transmits the change instruction signal; and further, on the mobile terminal 204 side, in response to the change instruction signal transmitted from the control device 230, the settings set on the mobile terminal 204 side are transmitted to the control device 230. However, as illustrated in FIG. 24, without performing any of the setting change request from the mobile terminal 204 to the control device 230, the request-based transmission of the change instruction signal from the control device 230 to the mobile terminal 204, and the response to the change instruction signal from the mobile terminal 204 to the control device 230, the settings transmitted from the mobile terminal 204 may be directly received by the control device 230. For example, in the case where an amount of data on the settings transmitted from the mobile terminal 204 to the control device 230 is small, it is better to employ a method as illustrated in FIG. 24.

Figure 22:
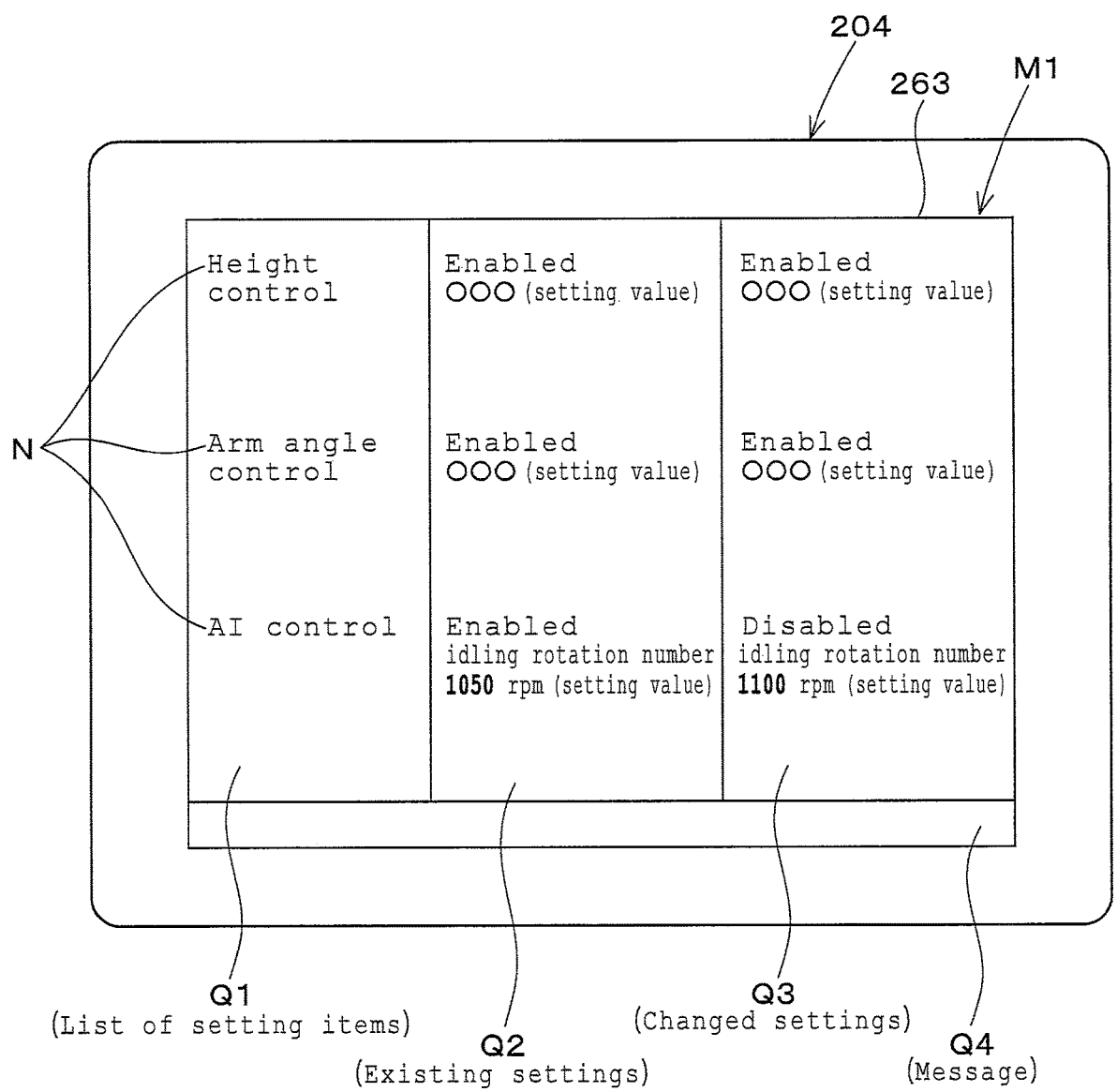
FIG. 22 is a diagram illustrating a setting screen of the mobile terminal.

Next, with reference to FIGS. 16 and 22, content setting by the mobile terminal 204 is described.

As illustrated in FIG. 16, the mobile terminal 204 is provided with setting screen display means 260, change means 261, and settings transmitting means 262. The setting screen display means 260, change means 261, and settings transmitting means 262 are respectively configured to include programs and the like stored in the mobile terminal 204. Also, the mobile terminal 204 has a display part 263 for displaying the setting screen M1. In addition, the display part 263 may be one of a touch panel type as will be described later, or besides, may be one not of the touch panel type as long as being able to display various pieces of information.

The setting screen display means 260 is one that, in response to the change instruction signal, displays the setting screen M1 for changing settings on the display part 263. For example, upon receipt of the change instruction signal transmitted from the control device 230 through the display device 203, the setting screen display means 260 activates the setting control program for displaying the setting screen M1 to display the setting screen M1 on the display part 263 of the mobile terminal 204.

In the case where the setting control program has already been stored in the mobile terminal 204, the setting screen display means 260 activates the stored setting control program to display the setting screen M1 on the display part. On the other hand, in the case where the mobile terminal 204 does not have the setting control program, the setting screen display means 260 downloads the setting control program that is transmitted from the display device 203 (control device 230) together with the change instruction signal, and activates the downloaded setting control program to display the setting screen M1 on the display part.

The setting screen M1 in the mobile terminal 204 may be adapted to be, as described above, completely the same screen (characters, numerical values, design, size, display range, and the like are all the same) as the setting screen M1 of the display device 203, or may also be adapted to be a screen that collectively displays a plurality of divided displays on the setting screen M1 of the display device 203.

Specifically, for example, as illustrated in FIG. 22, on the setting screen M1 of the mobile terminal 204, in the left side part, a list of all of the setting items N is displayed; in the center part, already set settings (existing settings) of the respective setting items N are displayed; in the right side part, changed settings (settings set with the mobile terminal 204) are displayed, and in the lower side part, guidance (message) is displayed. That is, the mobile terminal 204 divides the one setting screen M1 into the plurality of areas, and in the respective divided areas, displays the list of the setting items, existing settings, changed settings, message, and the like. For convenience of description, a part that displays the list of the setting items is referred to as a first area Q1; a part that displays the existing settings is referred to as a second area Q2; a part that displays the changed settings is referred to as a third area Q3; and a part that displays the guidance is referred to as a fourth area Q4.

In addition, in the case where together with the change instruction signal, settings already stored in the content storage means 253 are received from the control device 230, the setting screen display means 260 displays the received existing settings in the second area Q2, and in the case where the settings are not received, does not display the existing settings in the second area Q2.

The change means 261 is one that changes the settings displayed on the setting screen M1.

For example, in the case where the display part of the mobile terminal 204 is one of the touch panel type, by touching a setting corresponding to any of the setting items displayed in the third area with a finger, the change means 261 pops up the setting corresponding to the touched setting item on the setting screen M1 to make the setting item changeable on a pop-up screen.

For example, by touching a setting of the idling rotation number in the third area, the change means 261 displays the idling rotation number on the pop-up screen. On the pop-up screen, the change means 261 automatically displays a numerical keypad for changing a numerical value of the idling rotation number. By operating the numerical keypad on the pop-up screen displaying the numerical keypad, the idling rotation number can be changed.

Also, by touching a setting (Enabled or Disabled) of the arm limitation setting in the third area, "Enabled" or "Disabled" of the arm angle control is displayed on the pop-up screen by the change means 261. In the case where "Enabled" is already displayed on the pop-up screen, by touching "Enabled", the change means 261 changes the setting to "Disabled", and in the case where "Disabled" is already displayed, by touching "Disabled", changes the setting to "Enabled".

As described above, the change means 261 can freely change the settings displayed on the setting screen M1. Note that the touch panel is taken as an example to provide the description; however, the change means 261 may be adapted to change the settings displayed on the setting screen M1 by operating a switch or the like or by making a speech sound, and the change means 261 may be any means as long as the means can change the settings.

The settings transmitting means 262 is means adapted to transmit a setting changed on the setting screen M1 to the display device 203 (control device 230). For example, by touching a display indicating setting completion displayed on the setting screen M1 in the mobile terminal 204, the setting changed by the change means 261 is transmitted to the control device 230 through the display device 203. The settings transmitting means 262 is means adapted to, in the case where the setting completion is indicated, transmit the setting to the display device 203 (control device 230). In addition a method for indicating the setting completion may be any method such as a method that touches the display indicating the setting completion as described above, a method using a switch or the like to make the indication, or a method using a speech sound to make the indication.

The mobile terminal 204 may be provided with content checking means adapted to, as described above, check the check-use settings transmitted from the display device 203 (control device 230) and the transmission-use settings on the mobile terminal 204 side with each other. In this case, in the case where the both of the settings coincide with each other, the mobile terminal 204 transmits the coincidence signal indicating the coincidence of the settings to the display device 203 (control device 230), and in the case where both of the settings do not coincide with each other, transmits the noncoincidence signal indicating the noncoincidence of the settings to the display device 203 (control device 230). In the case where both of the settings do not coincide with each other, upon the retransmission request transmitted from the display device 203 (control device 230), the settings transmitting means 262 retransmits the settings. The settings transmitting means 262 repeatedly transmits the settings until both of the settings coincide with each other.

According to the present invention, the change instruction transmitting means 250, the content receiving means 251, and the content storage means 253 are provided, and therefore with a worker operating the working machine 202 holding the mobile terminal 204 at hand, the worker can easily change settings of the working machine 202 only by operating the mobile terminal 204. Also, the change instruction transmitting means 250 is configured to transmit settings already stored on the working machine 202 side to the mobile terminal 204, so that when the worker changes settings, the worker can change the settings to new settings while seeing the settings before the change, and therefore the worker easily plans how to change the settings from the current situation and even in this regard, can easily make the settings.

Further, the change instruction transmitting means 250 is configured to transmit the program (setting control program) for displaying the setting screen M1 to the mobile terminal 204, and therefore even in the case where the mobile terminal 204 possessed by the worker does not have the setting control program, the worker can change the settings.

Also, according to the present invention, the content checking means adapted to check the check-use settings and the transmission-use settings on the mobile terminal 204 side with each other is provided, and the content storage means 253 is configured to, in the case where matching between both of the settings is established, store the settings transmitted from the mobile terminal 204 as new settings, so that noncoincidence between both of the settings due to, for example, a communication error between the display device 203 (control device 230) and the mobile terminal 204 can be prevented to increase reliability of changes in settings by the mobile terminal 204.

In the above-described embodiment, the backhoe 202 is taken as an example to provide the description; however, the working machine 202 may be a tractor, combine harvester, transplanter, or the like.

In the above-described embodiment, the change instruction transmitting means 250, content receiving means 251, and content storage means 253 are provided in the control device 230 installed in the working machine 202; however, without limitation to the control device 230, the change instruction transmitting means 250, content receiving means 251, and content storage means 254 may be provided in the display device 203 itself for performing an operation, display, and other operations of a setting change. That is, the above-described functions of the control device may be provided in the display device 203. In this case, with the communication part (transceiver part) 228 being connected not to the display device 203 but to the control device 230, the mobile terminal may directly make data communication with the control device 230 without the display device 203.

Also, the mobile terminal 204 is provided with the content checking means; however, the content checking means may be provided in the display device 203 or any of the control devices. In addition, the above-described mobile terminal 204 is one that, in order to make the content settings of the working machine 202, displays the setting screen M1; however, the mobile terminal 204 may be one that displays the normal screen and the like as an auxiliary of the display device 203. For example, completely the same screen as the normal screen of the display device 203 is displayed on the mobile terminal 204, or content that cannot be displayed on one screen of the display device 203 is displayed on one screen of the mobile terminal 204 in place of the display device 203. Alternatively, a worker may freely select any of display items (engine rotation number, fuel, oil temperature, warning) that the worker desires to display on one screen of the mobile terminal 204 to display the selected display item on the mobile terminal 204 side.

The setting control program of the mobile terminal 204 may be obtained by being downloaded from a server of a manufacturing company manufacturing the working machine 202 or another company to the mobile terminal 204 through the Internet. The storage part 253 that stores values and the like related to setting changes and the like is only required to be provided on the working machine side, and may be provided in a device other than the first control device 230A, such as the second control device 230B or the display device 203.

Note that the embodiments disclosed herein should be considered as being exemplified in all aspects, but not as being limited. The scope of the present invention is pointed out not in the above description but in the scope of claims, and intended to include equivalent meanings to the scope of claims and all modifications within the scope.

REFERENCE SIGNS LIST

1 Data communication system for working machine
2 Working machine
3 Mobile terminal
10 Traveling car body
11 Engine
12 Transmission
13 Control device
14 Three-point link mechanism
15 Working unit
16 Cabin
17 Driver's seat
18 Display device
27 Injector
28 Common rail
29 Supply pump
30 Communication part (transceiver part)
31 Storage part of first control device
32 Storage part of mobile terminal
40 ID code obtaining means
41 ID code checking means
42 Data communication means
43 Data writing means
44 Data distribution means
45 ID code registration means
101 Operation system for working machine
102 Working machine
103 Management server
104 Mobile terminal
105 Control device
105A First control device
105B Second control device
107 Data storage means
108 Data transmitting means
110 Traveling car body
111 Engine
112 Transmission
114 Three-point link mechanism
115 Working unit
116 Cabin
117 Driver's seat
118 Display device
127 Injector
128 Common rail
129 Supply pump
130 Communication part (transceiver part)
140 ID code obtaining means
141 ID code checking means
142 Control restriction means
143 Storage part
150 User information storage means
151 ID code transmitting means
201 Setting change system for working machine
202 Working machine
203 Display device
204 Mobile terminal
210 Traveling unit
211 Revolving body
212 Traveling body
213 Dozer
214 Revolving bearing
215 Revolving base
216 Working unit
217 Driver's seat
218 Display device
220 Support bracket
221 Swing bracket
222 Boom
223 Arm
224 Bucket
225 Boom cylinder
226 Arm cylinder
227 Bucket cylinder
230 Control device
230A First control device
230B Second control device
240 Display part of display device
240a Fixed display part
240b Liquid crystal display part
241 Switch
250 Change instruction transmitting means
251 Content receiving means
253 Content storage means (storage part)
260 Setting screen display means
261 Change means
262 Settings transmitting means
M1 Setting screen
N Setting item
Q1 First area
Q2 Second area
Q3 Third area
Q4 Fourth area

The invention claimed is:

1. A working machine comprising:
an operation lever;
an actuator to be activated in accordance with an operation amount of the operation lever, the actuator including at least one of a boom cylinder and an arm cylinder;
a control device to control the actuator based on the operation amount of the operation lever, the actuator being provided in the working machine and being configured to perform at least one of;
  a boom height control to stop stretching the boom cylinder when the operation lever is operated, thereby restricting an upper limit of height of the boom;
  an arm angle control to stop stretching the arm cylinder when the operation lever is operated, thereby restricting an upper limit of angle of the arm;
  a flow rate control to control the stretching of boom cylinder and the stretching of arm cylinder based on an operation amount of the operation lever when the operation lever is operated; and
  an auto-idle control to control rotation speed of a prime mover when the operation lever is not operated; and
a display device to display a setting screen provided for changing a setting related to the controlling of the actuator performed by the control device, the setting includes at least one of:
  activation and inactivation of the boom height control;
  activation and inactivation of the arm angle control; and
  the rotation speed in the auto-idle control,
wherein the control device includes:
  a content receiver to receive, in wireless communication with a mobile terminal,
    a request, from the mobile terminal, for changing the setting related to the controlling of the actuator performed by the control device, and
    the changing of at least one of the activation and inactivation of the boom height control, the activation and inactivation of the arm angle control, and the rotation speed in the auto-idle control in addition to the setting changed on a mobile terminal side, the setting being different from the setting changed on the setting screen of the display device;
  a content storage to store the setting that has been changed on the mobile terminal side as a new setting, the setting including the changing of at least one of the activation and inactivation of the boom height control, the activation and inactivation of the arm angle control, and the rotation speed in the auto-idle control; and
  a change instruction transmitter to transmit, to the mobile terminal upon receipt of the request for changing the setting from the mobile terminal, a change instruction signal instructing a mobile terminal to change at least one of the activation and inactivation of the boom height control, the activation and inactivation of the arm angle control, and the rotation speed in the auto-idle control in the wireless communication, the change instruction transmitter transmitting the change instruction signal to the motile terminal during a period in which the operation lever is not operated,
wherein the content receiver receives the setting that has been changed on the mobile terminal side in response to the change instruction signal, the setting including the changing of at least one of the activation and inactivation of the boom height control, the activation and inactivation of the arm angle control, and the rotation speed in the auto-idle control, and
wherein the control device controls the actuator based on the setting that has been changed on the mobile terminal side.

2. The working machine according to claim 1,
wherein the change instruction transmitter transmits, together with the change instruction signal, the setting changed on the setting screen that is the setting already stored in the content storage.

3. The working machine according to claim 1,
wherein the change instruction transmitter transmits, together with the change instruction signal, a program configured to display a setting screen on a display of the mobile terminal, the setting screen being provided for changing the setting.

4. A working machine comprising:
an operation lever;
an actuator to be activated in accordance with an operation amount of the operation lever, the actuator including at least one of a boom cylinder and an arm cylinder;
a control device to control the actuator based on the operation amount of the operation lever, the actuator being provided in the working machine and being configured to perform at least one of:
  a boom height control to stop stretching the boom cylinder when the operation lever is operated, thereby restricting an upper limit of height of the boom;
  an arm angle control to stop stretching the arm cylinder when the operation lever is operated, thereby restricting an upper limit of angle of the arm;
  a flow rate control to control the stretching of boom cylinder and the stretching of arm cylinder based on an operation amount of the operation lever when the operation lever is operated; and
  an auto-idle control to control rotation speed of a prime mover when the operation lever is not operated; and
a display device to display a setting screen provided for changing a setting related to the controlling of the actuator performed by the control device, the setting including at least one of:
  activation and inactivation of the boom height control;
  activation and inactivation of the arm angle control; and
  the rotation speed in the auto-idle control,
wherein the control device includes:
  a content receiver to receive, in wireless communication with a mobile terminal, the changing of at least one of the activation and inactivation of the boom height control, the activation and inactivation of the arm angle control, and the rotation speed in the auto-idle control in addition to the setting changed on a mobile terminal side, the setting being different from the setting changed on the setting screen of the display device, the content receiver receiving, from the mobile terminal, the setting during a time period in which the operation lever is not operated;
  a content storage to store the setting that has been changed on the mobile terminal side as a new setting, the setting including, the changing of at least one of the activation and inactivation of the boom height control, the activation and inactivation of the arm angle control, and the rotation speed in the auto-idle control; and
  a content checker to check the setting received by the content receiver and the setting transmitted from the mobile terminal with each other,
wherein in a case where matching between the settings is established, the content storage stores the setting received by the content receiver as a new setting, and
wherein the control device controls the actuator based on the new setting.

5. A setting change system for a working machine, comprising:
an operation lever;
an actuator to be activated in accordance with an operation amount of the operation lever, the actuator including at least one of a boom cylinder and an arm cylinder;
a control device to control the actuator based on the operation amount of the operation lever, the actuator being provided in the working machine and being configured to perform at least one of:
a boom height control to stop stretching the boom cylinder when the operation lever is operated, thereby restricting an upper limit of height of the boom;
an arm angle control to stop stretching the arm cylinder when the operation lever is operated, thereby restricting an upper limit of angle of the arm;
a flow rate control to control the stretching of boom cylinder and the stretching of arm cylinder based on an operation amount of the operation lever when the operation lever is operated; and
an auto-idle control to control rotation speed of a prime mover when the operation lever is not operated;
a display device to display a setting screen provided for changing a setting related to the controlling of the actuator performed by the control device, the setting including at least one of: and
activation and inactivation of the boom height control;
activation and inactivation of the arm angle control; and
the rotation speed in the auto-idle control; and
a mobile terminal to communicate with the control device in wireless communication,
wherein the control device includes:
a content receiver to receive, in wireless communication with the mobile terminal,
a request, from the mobile terminal, for changing the setting related to the controlling of the actuator performed by the control device, and
the changing of at least one of the activation and inactivation of the boom height control, the activation and inactivation of the arm angle control, and the rotation speed in the auto-idle control in addition to the setting changed on the mobile terminal side, the setting being different from the setting changed on the setting screen of the display device;
a content storage to store the setting that has been changed on the mobile terminal side as a new setting, the setting including the changing of at least one of the activation and inactivation of the boom height control, the activation and inactivation of the arm angle control, and the rotation speed in the auto-idle control; and
a change instruction transmitter to transmit, to the mobile terminal upon receipt of the request for changing the setting from the mobile terminal, a change instruction signal instructing a mobile terminal to change at least one of the activation and inactivation of the boom height control, the activation and inactivation of the arm angle control, and the rotation speed in the auto-idle control in the wireless communication, the change instruction transmitter transmitting the change instruction signal to the mobile terminal during a period in which the operation lever is not operated,
wherein the content receiver receives the setting that has been changed on the mobile terminal side in response to the change instruction signal, the setting including the changing of at least one of the activation and inactivation of the boom height control, the activation and inactivation of the arm angle control, and the rotation speed in the auto-idle control, and
wherein the control device controls the actuator based on the setting that has been changed on the mobile terminal side.

6. The setting change system according to claim 5, wherein the change instruction transmitter transmits, together with the change instruction signal, the setting changed on the setting screen that is the setting already stored in the content storage.

7. The setting change system according to claim 5, wherein the change instruction transmitter transmits, together with the change instruction signal, a program configured to display a setting screen on a display of the mobile terminal, the setting screen being provided for changing the setting.

8. A setting change system for a working machine, comprising:
an operation lever;
an actuator to be activated in accordance with an operation amount of the operation lever, the actuator including at least one of a boom cylinder and an arm cylinder;
a control device to control the actuator based on the operation amount of the operation lever, the actuator being provided in the working machine and being configured to perform at least one of:
a boom height control to stop stretching the boom cylinder when the operation lever is operated, thereby restricting an upper limit of height of the boom;
an arm angle control to stop stretching the arm cylinder when the operation lever is operated, thereby restricting an upper limit of angle of the arm;
a flow rate control to control the stretching of boom cylinder and the stretching of arm cylinder based on an operation amount of the operation lever when the operation lever is operated; and
an auto-idle control to control rotation speed of a prime mover when the operation lever is not operated;
a display device arranged on the working machine and configured to display a setting screen provided for changing a setting related to the control of the actuator performed by the control device, the setting including at least one of:
activation and inactivation of the boom height control;
activation and inactivation of the arm angle control; and
the rotation speed in the auto-idle control; and
a mobile terminal to communicate with the control device in wireless communication,
wherein the control device includes:
a content receiver to receive, in wireless communication with the mobile terminal, the changing of at least one of the activation and inactivation of the boom height control, the activation and inactivation of the arm angle control, and the rotation speed in the auto-idle control in addition to the setting changed on the mobile terminal side, the setting being different from the setting changed on the setting screen of the display device, the content receiver receiving, from the mobile terminal, the setting during a time period in which the operation lever is not operated;

a content storage to store the setting that has been changed on the mobile terminal side as a new setting, the setting including the changing of at least one of the activation and inactivation of the boom height control, the activation and inactivation of the arm angle control, and the rotation speed in the auto-idle control; and a content checker to check the setting received by the content receiver and the setting transmitted from the mobile terminal with each other, wherein in a case where matching between the settings is established, the content storage stores the setting received by the content receiver as a new setting, and wherein the control device controls the actuator based on the new setting.

* * * * *